US005473680A

United States Patent [19]

Porter

[11] Patent Number: 5,473,680
[45] Date of Patent: Dec. 5, 1995

[54] METHODS AND APPARATUS FOR INTERFACING WITH APPLICATION PROGRAMS TO MANAGE MULTIMEDIA MULTIPARTY COMMUNICATIONS

[75] Inventor: Frederick D. Porter, Pittstown, N.J.

[73] Assignee: Bell Communications Research, Inc., Livingston, N.J.

[21] Appl. No.: 260,370

[22] Filed: Jun. 14, 1994

[51] Int. Cl.⁶ .................................................. H04M 3/00
[52] U.S. Cl. .......................... 379/201; 379/207; 379/265; 379/266; 370/62; 370/58.1
[58] Field of Search .............................. 379/201, 93, 94, 379/207, 265, 266, 221; 370/62, 58

[56] References Cited

U.S. PATENT DOCUMENTS

| | | | |
|---|---|---|---|
| 4,713,806 | 12/1987 | Oberlander et al. | 370/62 |
| 5,168,515 | 12/1992 | Gechter et al. | 379/265 |
| 5,241,580 | 8/1993 | Babson, III | 379/201 |
| 5,243,643 | 9/1993 | Sattar et al. | 379/201 |
| 5,311,577 | 5/1994 | Madrid et al. | 379/201 |
| 5,323,452 | 6/1994 | Dickman et al. | 379/201 |
| 5,335,268 | 8/1994 | Kelly, Jr. et al. | 379/265 |
| 5,381,471 | 1/1995 | Balakrishnan et al. | 379/265 |

OTHER PUBLICATIONS

Sunsoft, Inc., "Introduction to the Solaris Teleservices API," *Solaris Teleservices 1.0 API Programming Guide*, EDR1, Jun. 1993, Mountain View, Calif.

C. Fitzgerald et al., Intel. Corporation and Microsoft Corporation, "The Windows Telephony Application Programming Interface," *API2*, May 1993, pp. 1–7.

*Primary Examiner*—Jeffery A. Hofsass
*Assistant Examiner*—Scott Wolinsky
*Attorney, Agent, or Firm*—Leonard Charles Suchyta; Joseph Giordano

[57] ABSTRACT

A system connected to a network for controlling multiparty, multimedia calls having three components. The first component sends and receives multiparty, multimedia calls. The second component stores building blocks representing the multiparty, multimedia calls. The building blocks include objects, which correspond to different aspects of multiparty, multimedia calls, and relationships between the objects. The third component monitors the objects and their relationships, and notifies when changes occur in the objects or their relationships.

16 Claims, 29 Drawing Sheets

FIG. 4

CALL OBJECT IDENTIFIERS — 300

| | | | NETWORK CALL OBJECT IDENTIFIERS | | | | LOCAL CALL OBJECT IDENTIFIERS | |
|---|---|---|---|---|---|---|---|---|
| Trans-action Object ID | Trans Type | PARTY SET | PARTY | PARTY SERVICE LINK | ABSTRACT SERVICE | NETWORK MAPPING ELEMENT | ACCESS CHANNEL | LOCAL MAPPING ELEMENT | USER DEVICE |
| NONE | NONE | CALL_1 | ANNE | HIGH_QUALITY_VIDEO | VIDEO_1 | UP_VIDEO_NET_1 | NTSC_ON_ATM | UP_VIDEO_LOC | CAMERA_1 |
| NONE | NONE | CALL_1 | ANNE | HIGH_QUALITY_VIDEO | VIDEO_1 | DOWN_VIDEO_NET_1 | NTSC_ON_ATM | DOWN_VIDEO_LOC | MONITOR_1 |
| NONE | NONE | CALL_1 | ANNE | HIGH_QUALITY_AUDIO | AUDIO_1 | DOWN_VIDEO_NET_1 | 7Khz_AUDIO | DOWN_AUDIO_LOC | SPEAKER_1 |
| NONE | NONE | CALL_1 | BOB | LOW_QUALITY_AUDIO | AUDIO_2 | DOWN_VIDEO_NET_2 | 7Khz_AUDIO | DOWN_AUDIO_LOC | SPEAKER_1 |

310 / 320 / 330 / 340 / 350 / 360 / 370 / 380 / 390 / 395

397a, 397b, 397c, 397d — 397

TRANSACTION OBJECT IDENTIFIERS

FIG. 6

| TransactionID | TransType | CALL OBJECT IDENTIFIERS |
|---|---|---|
| NONE | NONE | A |
| NONE | NONE | B |

FIG. 7

| TransactionID | TransType | CALL OBJECT IDENTIFIERS |
|---|---|---|
| NONE | NONE | A |
| NONE | NONE | C |

FIG. 11
POINT-TO-POINT AUDIO CALL IN PROCESS

| Trans-action ID | Trans Type | PARTY SET | PARTY | PARTY SERVICE LINK | ABSTRACT SERVICE | NETWORK MAPPING ELEMENT | ACCESS CHANNEL | LOCAL MAPPING ELEMENT | USER DEVICE |
|---|---|---|---|---|---|---|---|---|---|
| NONE | NONE | CALL 1 | PARTY 1 | PSL 1 | AUDIO 1 | UP_NME 1 | AUDIO 1 | UP_LME 1 | MIKE 1 |
| NONE | NONE | CALL 1 | PARTY 1 | PSL 1 | AUDIO 1 | DOWN_NME 1 | AUDIO 1 | DOWN_LME 1 | SPEAKER 1 |

TRANSACTION TABLE (EMPTY)

| TransactionID | TransState | ResourceInfo |
|---|---|---|
| | | |

APPLICATION WISHING TO JOIN CALL SENDS UPDATE TO USER API SUPPORT COMPONENT

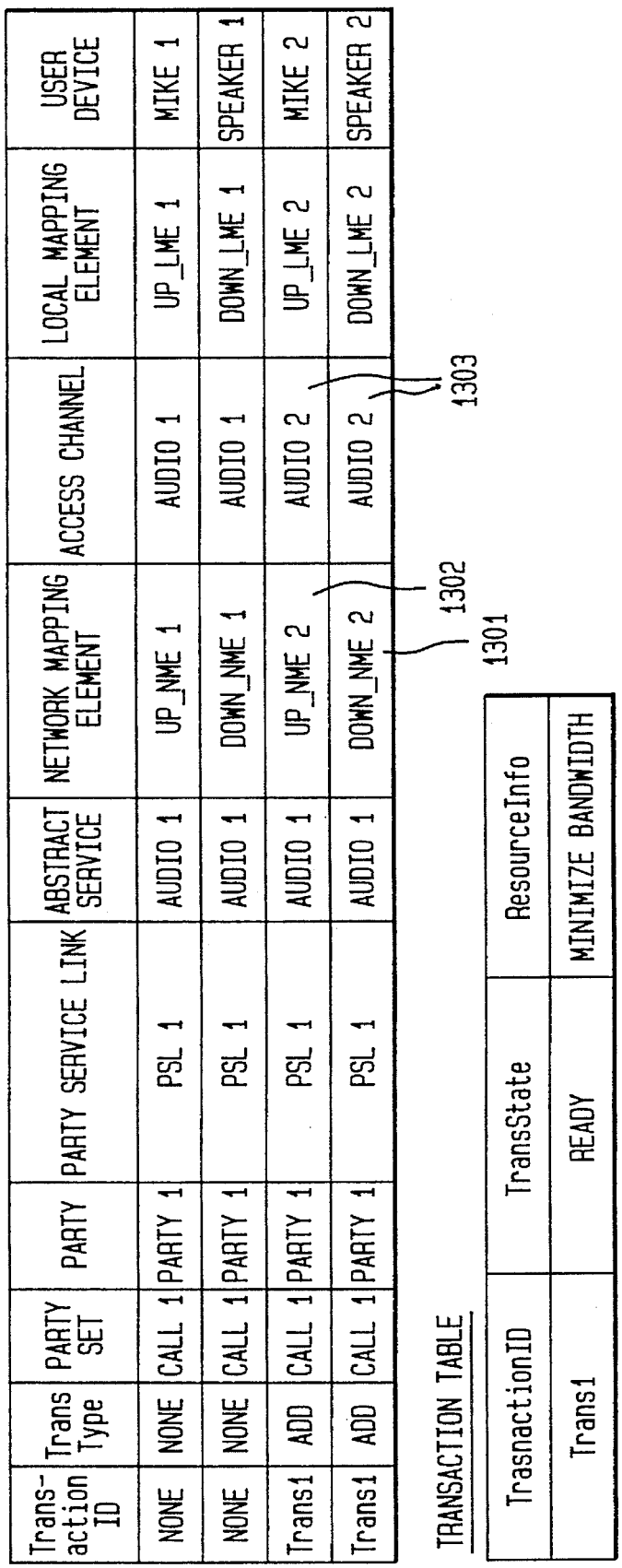

FIG. 13

USER API SUPPORT COMPONENT SENDS UPDATE TO INFRASTRUCTURE API SUPPORT COMPONENT

| Trans-action ID | Trans Type | PARTY SET | PARTY | PARTY SERVICE LINK | ABSTRACT SERVICE | NETWORK MAPPING ELEMENT | ACCESS CHANNEL | LOCAL MAPPING ELEMENT | USER DEVICE |
|---|---|---|---|---|---|---|---|---|---|
| NONE | NONE | CALL 1 | PARTY 1 | PSL 1 | AUDIO 1 | UP_NME 1 | AUDIO 1 | UP_LME 1 | MIKE 1 |
| NONE | NONE | CALL 1 | PARTY 1 | PSL 1 | AUDIO 1 | DOWN_NME 1 | AUDIO 1 | DOWN_LME 1 | SPEAKER 1 |
| Trans1 | ADD | CALL 1 | PARTY 1 | PSL 1 | AUDIO 1 | UP_NME 2 | AUDIO 2 | UP_LME 2 | MIKE 2 |
| Trans1 | ADD | CALL 1 | PARTY 1 | PSL 1 | AUDIO 1 | DOWN_NME 2 | AUDIO 2 | DOWN_LME 2 | SPEAKER 2 |

TRANSACTION TABLE

| TrasnactionID | TransState | ResourceInfo |
|---|---|---|
| Trans1 | READY | MINIMIZE BANDWIDTH |

FIG. 14

RESOURCE MANAGER COMPONENT SENDS UPDATE TO INFRASTRUCTURE API SUPPORT COMPONENT AFTER MODIFYING THE ACCESS CHANNEL AND MAPPING ELEMENT OBJECTS. THE NEW CONFIGURATION MINIMIZES BANDWIDTH REQUIREMENTS BY TAKING ADVANTAGE OF LOCAL AUDIO MIXING RESOURCES

| Trans-action ID | Trans Type | PARTY SET | PARTY | PARTY SERVICE LINK | ABSTRACT SERVICE | NETWORK MAPPING ELEMENT | ACCESS CHANNEL | LOCAL MAPPING ELEMENT | USER DEVICE |
|---|---|---|---|---|---|---|---|---|---|
| NONE | NONE | CALL 1 | PARTY 1 | PSL 1 | AUDIO 1 | UP_NME 1 | AUDIO 1 | UP_LME 1 | MIKE 1 |
| NONE | NONE | CALL 1 | PARTY 1 | PSL 1 | AUDIO 1 | DOWN_NME 1 | AUDIO 1 | DOWN_LME 1 | SPEAKER 1 |
| Trans1 | ADD | CALL 1 | PARTY 1 | PSL 1 | AUDIO 1 | UP_NME 2 | AUDIO 1 | UP_LME 2 | MIKE 2 |
| Trans1 | ADD | CALL 1 | PARTY 1 | PSL 1 | AUDIO 1 | DOWN_NME 2 | AUDIO 1 | DOWN_LME 2 | SPEAKER 2 |

TRANSACTION TABLE

| TransactionID | TransState | ResourceInfo |
|---|---|---|
| Trans1 | READY | NONE |

FIG. 15

TRANSACTION MANAGER COMPONENT SEND UPDATE TO INFRASTRUCTURE API SUPPORT COMPONENT INDICATING THAT THE TRANSACTION COMMITTED

| Trans-action ID | Trans Type | PARTY SET | PARTY | PARTY SERVICE LINK | ABSTRACT SERVICE | NETWORK MAPPING ELEMENT | ACCESS CHANNEL | LOCAL MAPPING ELEMENT | USER DEVICE |
|---|---|---|---|---|---|---|---|---|---|
| NONE | NONE | CALL 1 | PARTY 1 | PSL 1 | AUDIO 1 | UP_NME 1 | AUDIO 1 | UP_LME 1 | MIKE 1 |
| NONE | NONE | CALL 1 | PARTY 1 | PSL 1 | AUDIO 1 | DOWN_NME 1 | AUDIO 1 | DOWN_LME 1 | SPEAKER 1 |
| NONE | NONE | CALL 1 | PARTY 1 | PSL 1 | AUDIO 1 | UP_NME 1 | AUDIO 1 | UP_LME 2 | MIKE 2 |
| NONE | NONE | CALL 1 | PARTY 1 | PSL 1 | AUDIO 1 | DOWN_NME 1 | AUDIO 1 | DOWN_LME 2 | SPEAKER 2 |

TRANSACTION TABLE

| TransactionID | TransState | ResourceInfo |
|---|---|---|
|  |  |  |
|  |  |  |

GET STATE PROCEDURE

SET TRIGGER PROCEDURE

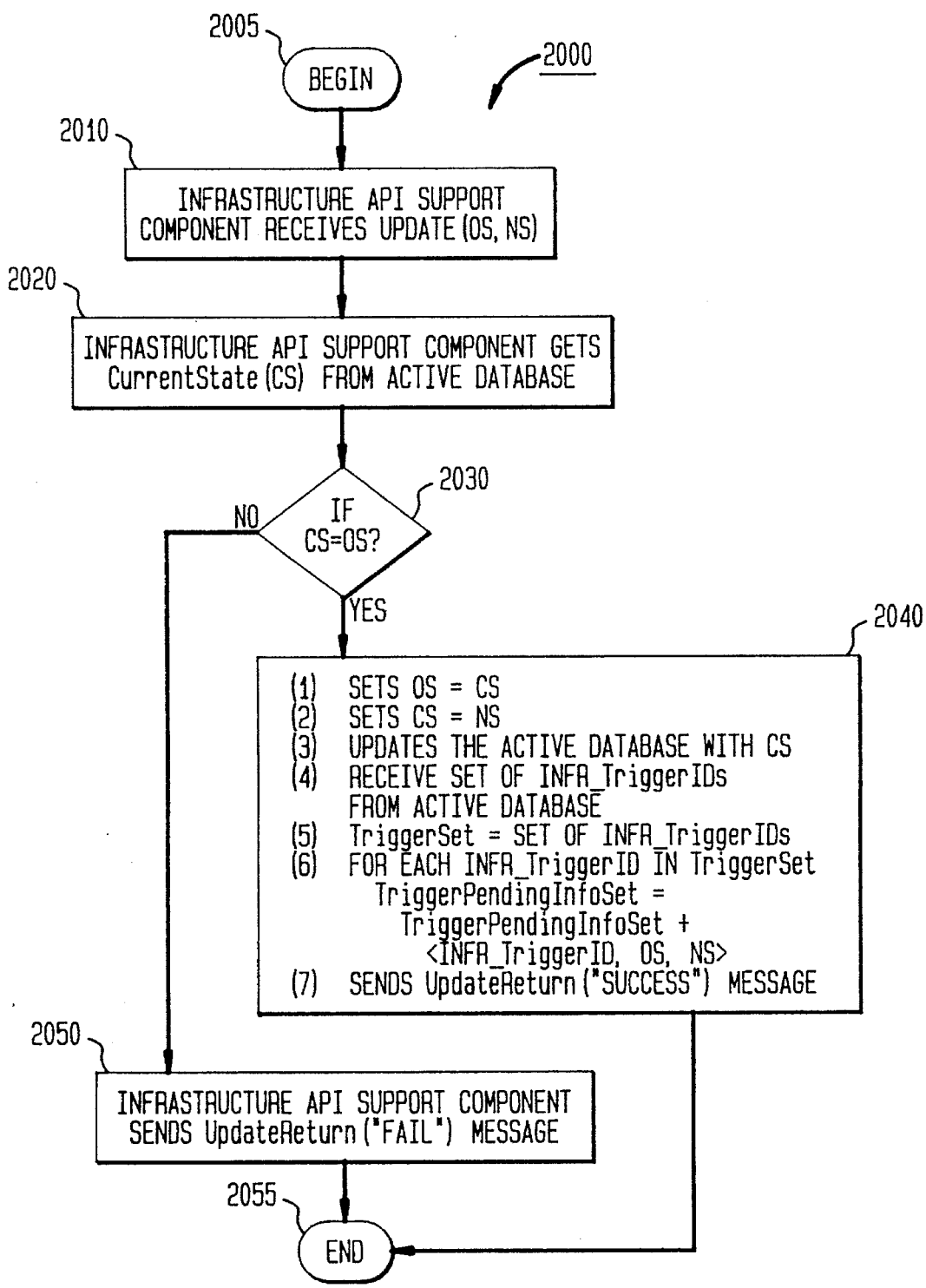

REMOVE_TRIGGER PROCEDURE

TRIGGER_DELIVERY PROCEDURE

UPDATE RESOURCES PROCEDURE
(CON'T)

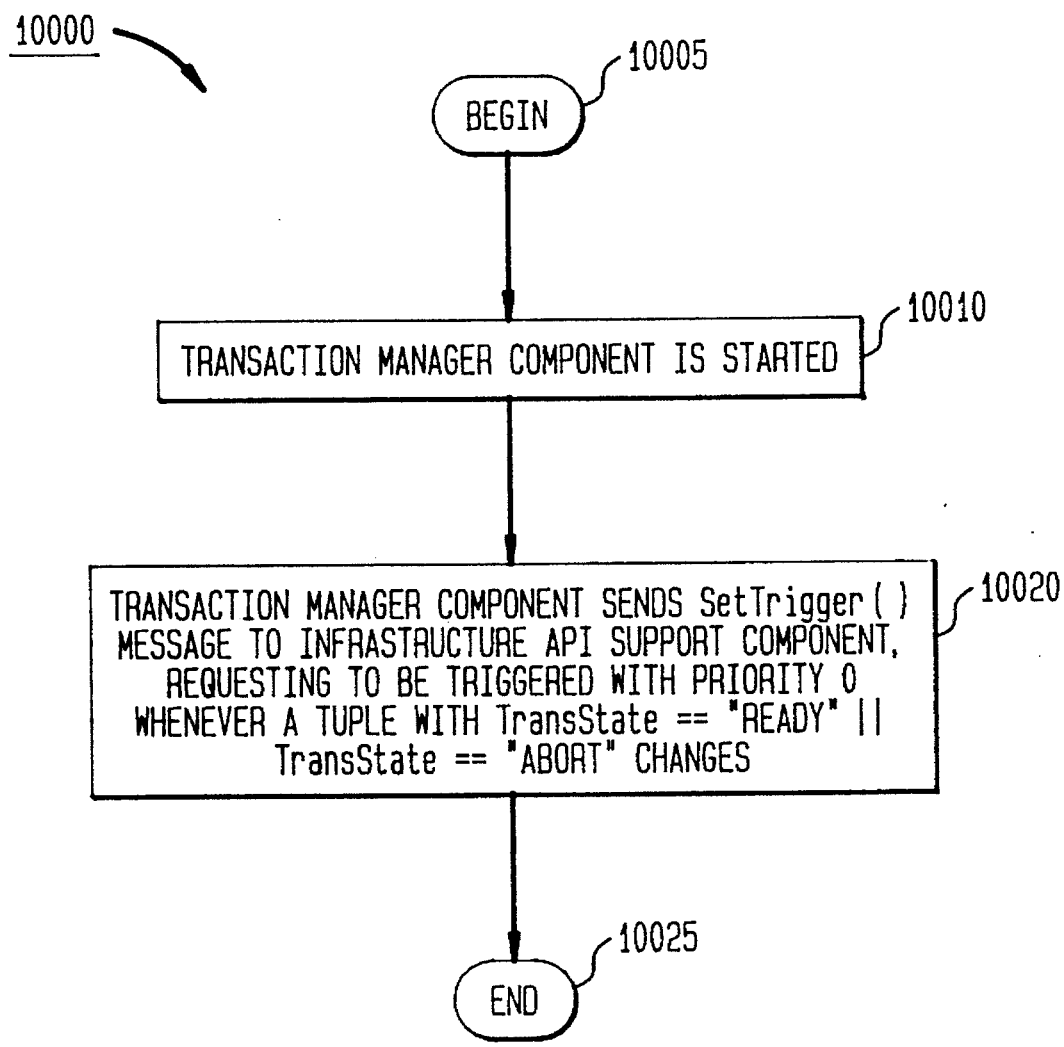

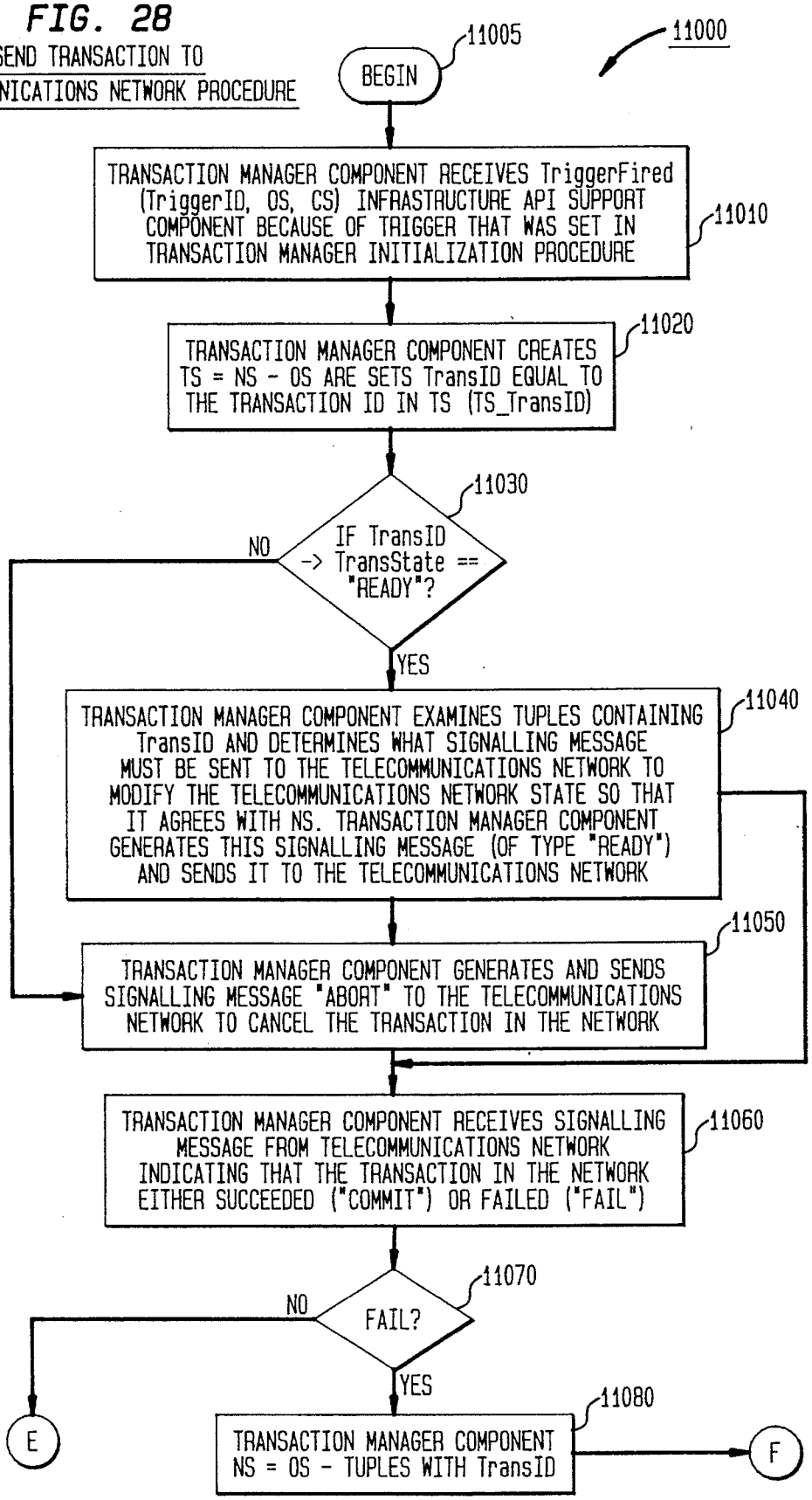

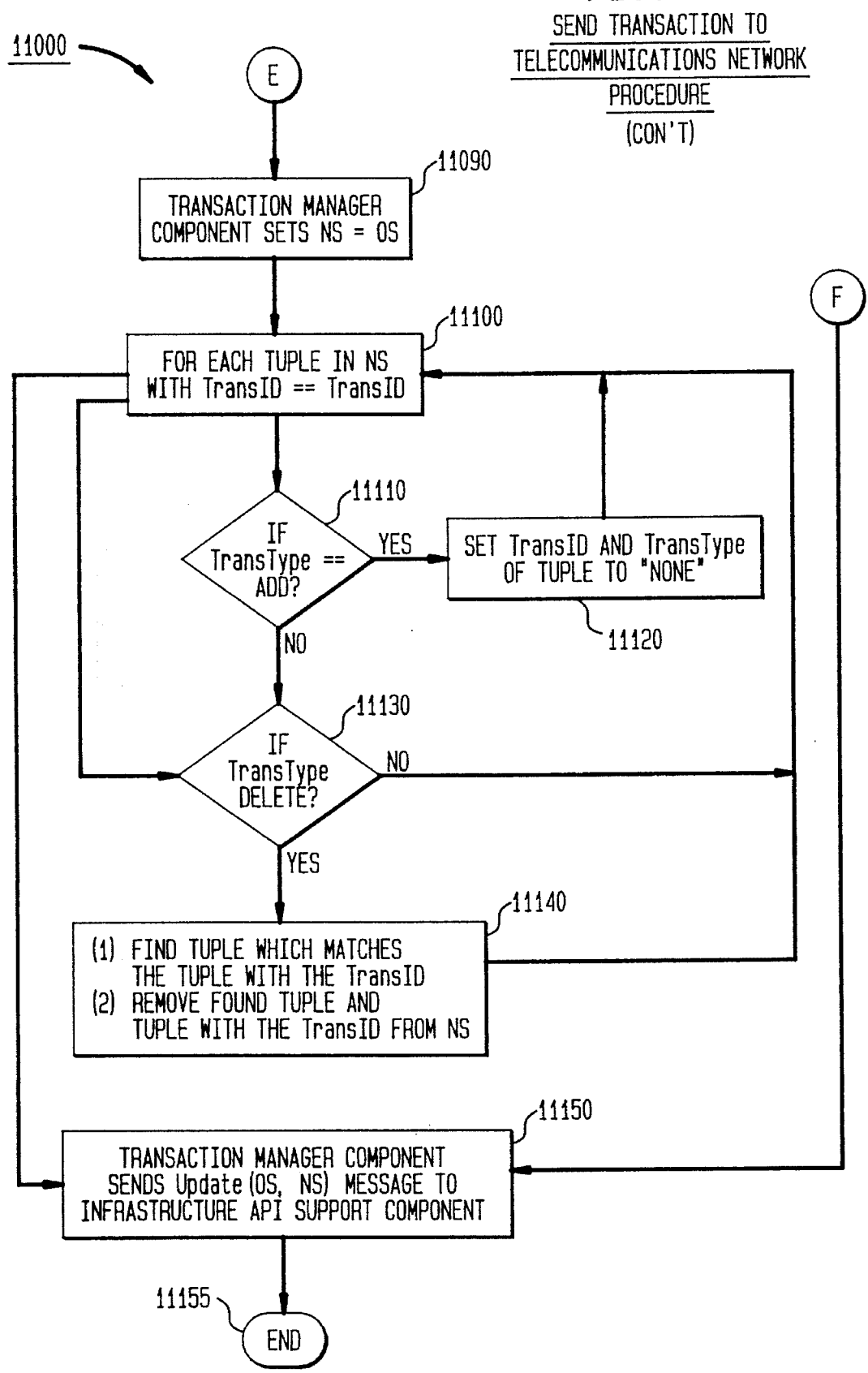

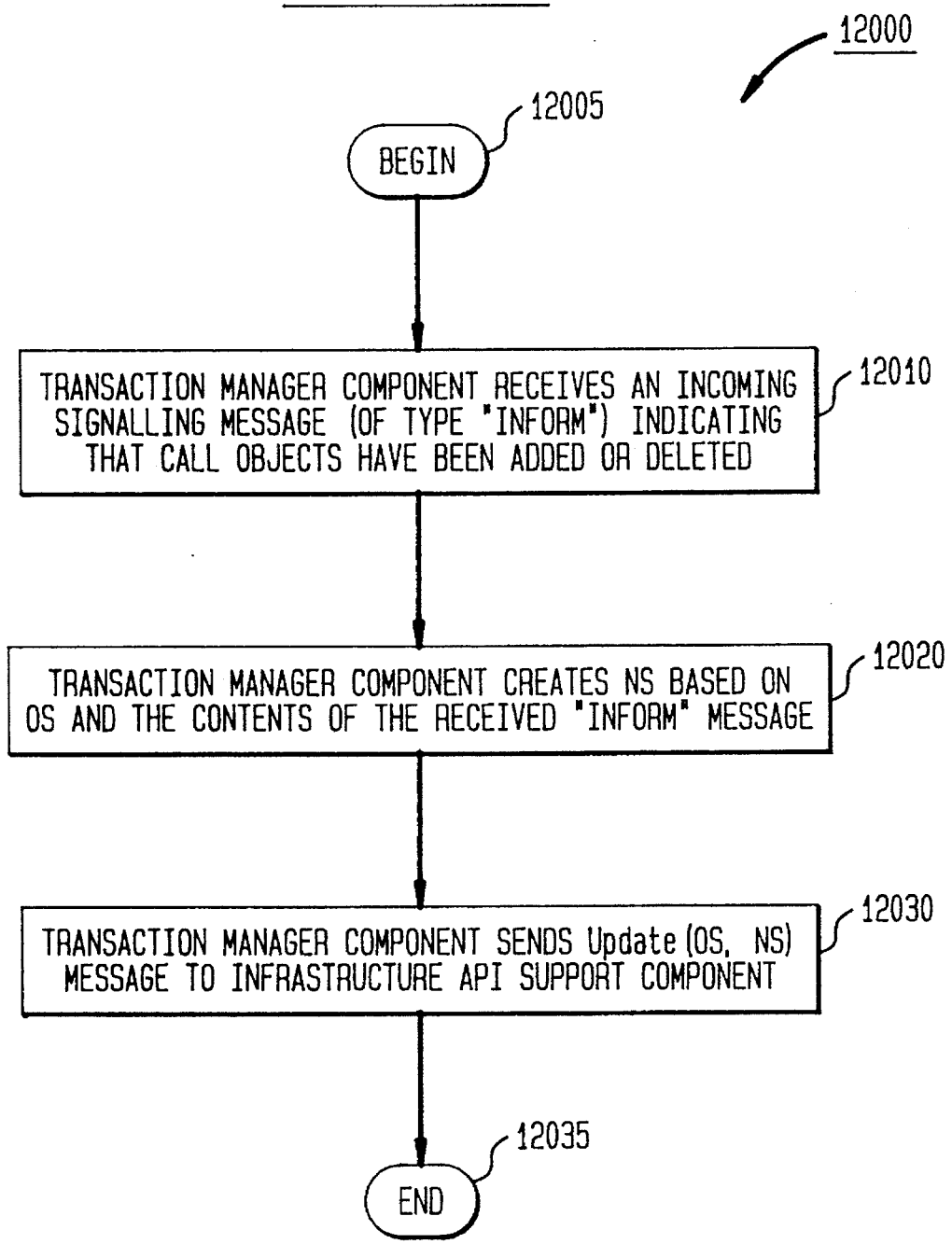

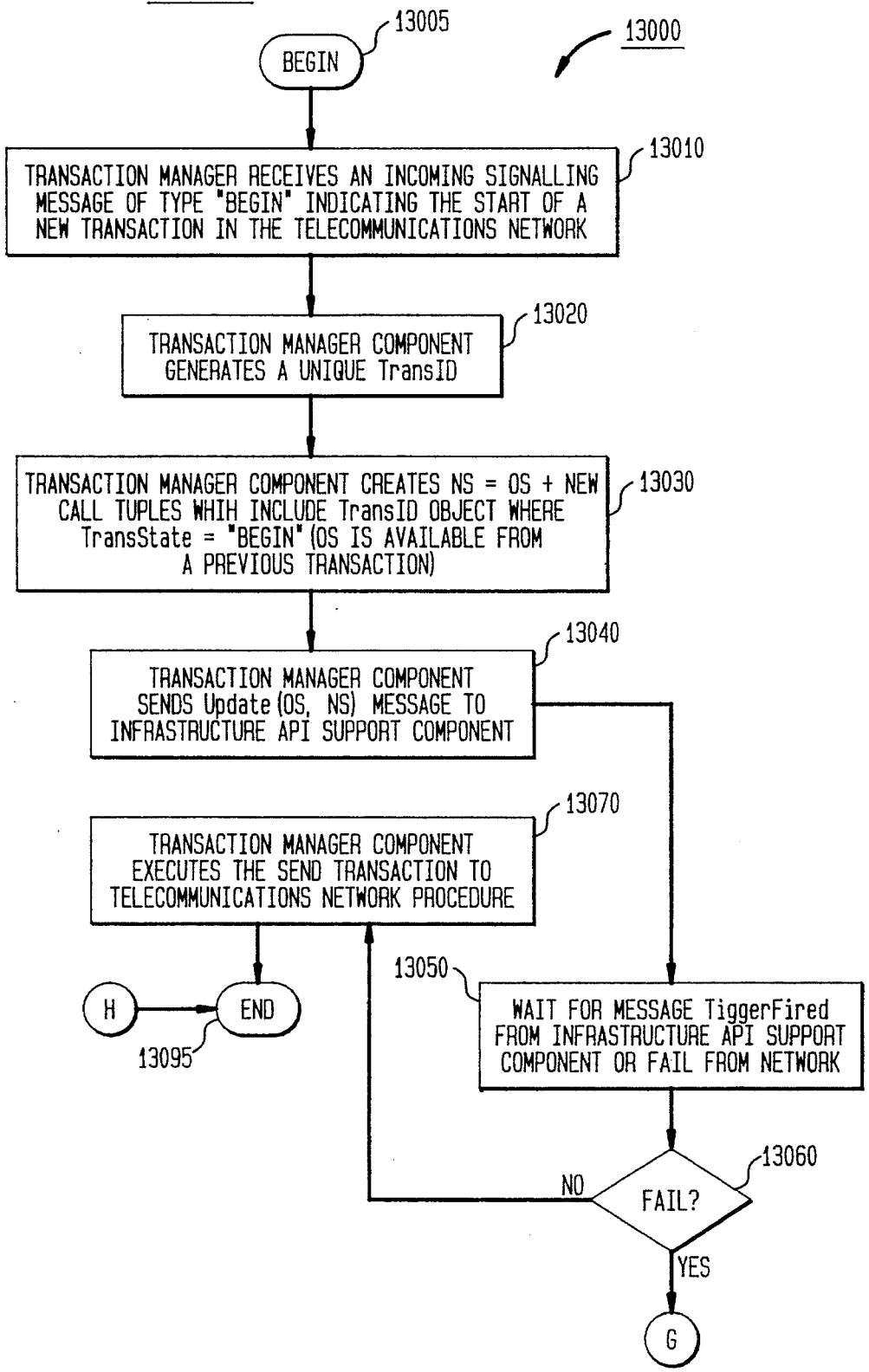

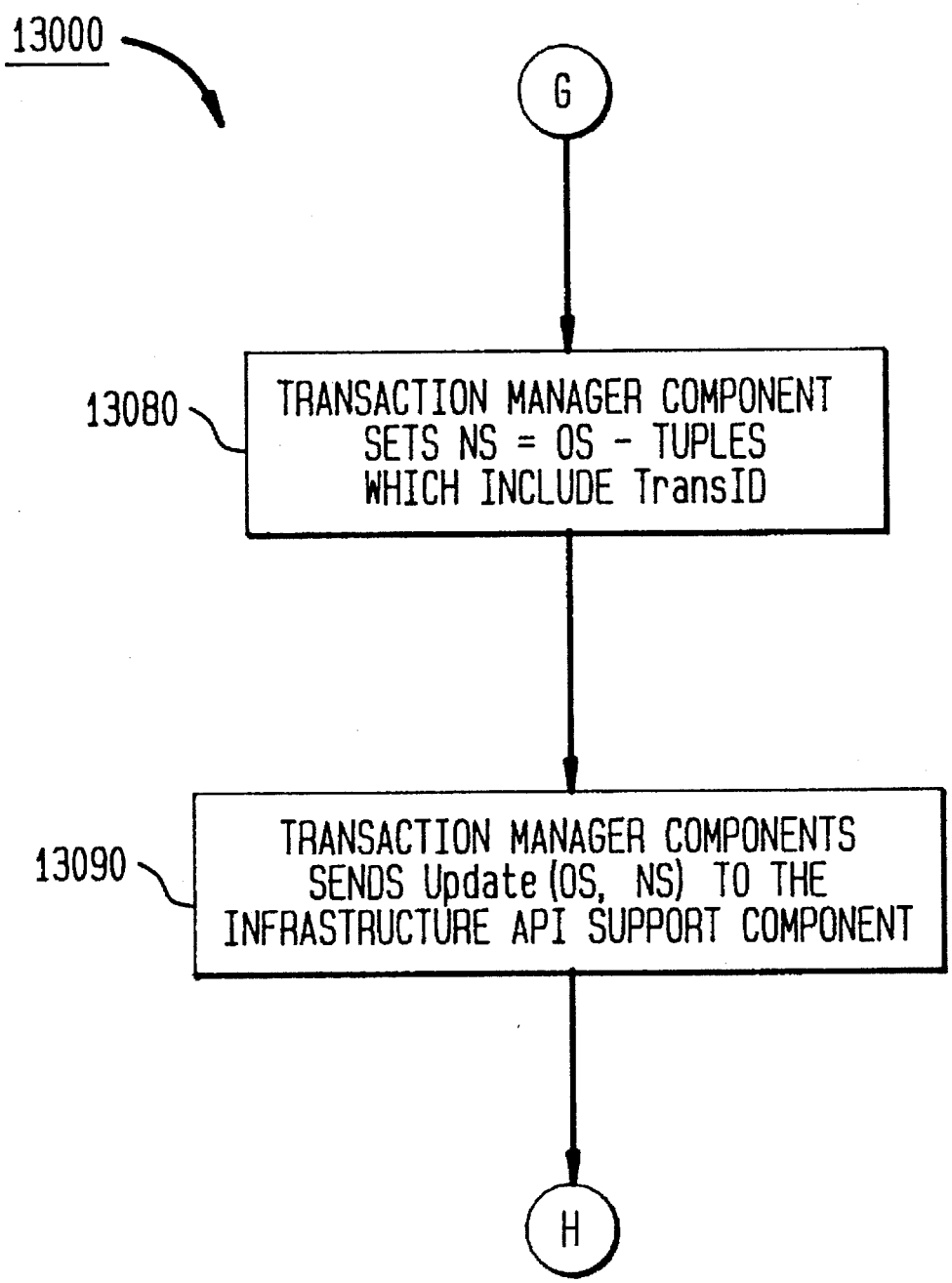

METHODS AND APPARATUS FOR INTERFACING WITH APPLICATION PROGRAMS TO MANAGE MULTIMEDIA MULTIPARTY COMMUNICATIONS

BACKGROUND OF THE INVENTION

1. Field of the Invention

This invention relates to multimedia multiparty communications systems and, more particularly, to methods for interfacing with application programs and for managing resources used for multimedia, multiparty communications. The invention facilitates the management of resources for multimedia, multiparty communications by providing a common framework for application developers to use to indicate when resources are required for multimedia multiparty communications and when resources are no longer required for multimedia multiparty communications. The invention further facilitates the management of other aspects of communications such as negotiation.

2. Description of the Related Art

The Windows Telephony Application Programming Interface (WTAPI) provided a framework for programmers to develop user applications that use the telephone. WTAPI permitted programmers to combine the graphical user interface (GUI) capabilities of Microsoft Windows with telephony applications. WTAPI also permitted integrated messaging for user applications, which permits users to use their computers for electronic mail, voice mail, and to receive incoming facsimiles.

Although WTAPI allowed programmers to produce certain types of telephony applications, these applications could not take advantage of the many other developments in the telecommunications industry.

For example, the telecommunications industry has been developing new telecommunications networks called broadband networks, such as B-ISDN, which can simultaneously transmit sound, video, and data. Broadband networks may include new protocols for multimedia communications and additional functions based on new network resources such as multimedia hardware for mixing, combining, and transcoding sound, video, and data from different sources.

Broadband networks will permit multimedia, multiparty calls between users with heterogeneous desktop computers or other terminal equipment. User applications cannot handle multimedia, multiparty calls using WTAPI. To do so requires a framework, including sophisticated methods for managing multimedia multiparty calls. Such a framework must permit several user applications to combine many calls using multimedia hardware, regardless of whether the hardware is in the broadband network or in the terminal equipment (e.g. desktop computer). The framework must also permit several independently-developed applications to share control of different aspects of the same multimedia multiparty call.

WTAPI cannot support this framework because WTAPI does not logically distinguish between different objects, such as multiple parties, communications services, or communications links, that make up multimedia multiparty calls. WTAPI users can only manage a call as a monolithic object.

In addition, WTAPI requires application developers to write separate program code to handle multiparty hardware which mixes, combines, and transcodes sound, video, and data located in the broadband network and locally at a desktop computer or local area network.

SUMMARY OF THE INVENTION

Accordingly, the present invention is directed to methods for interfacing with application programs and for managing resources used for multimedia multiparty communications that obviate one or more of the problems due to limitations and disadvantages of the related art.

Features and advantages of the invention will be set forth in the description which follows, and in part will be apparent from the description, or may be learned by practice of the invention. The objectives and other advantages of the invention will be realized and attained by the method and apparatus particularly pointed out in the written description and claims thereof as well as the appended drawings.

To achieve the objects of this invention and attain its advantages, broadly speaking, this invention includes three components. The first component sends and receives multiparty, multimedia calls. The second component stores building blocks representing the multiparty, multimedia calls. The building blocks include objects, which correspond to different aspects of multiparty, multimedia calls, and relationships between the objects. The third component monitors the objects and their relationships, and notifies when changes occur in the objects or their relationships.

It is to be understood that both the foregoing general description and the following detailed description are exemplary and explanatory and are intended to provide further explanation of the invention as claimed.

BRIEF DESCRIPTION OF THE DRAWINGS

The accompanying drawings which are incorporated in and which constitute part of this specification, illustrate a presently preferred implementation of the invention and, together with the description, serve to explain the principles of the invention.

In the drawings:

FIG. 4 illustrates a system table used by the preferred implementation to represent the object-oriented call model illustrated in FIG. 3 in an active database;

FIGS. 6–8 illustrate the concept of how the preferred implementation updates the system and transaction tables of the active database. In particular:

FIG. 6 illustrates a state of the active database before an update;

FIG. 7 illustrates a state of the active database after an update;

FIG. 8 illustrates both the states included in FIGS. 6 and 7 and the information in the active database used for the update;

FIGS. 11–15 are examples of states of the active database, including a system table and a transaction table, which are used to explain the process of creating a call, as shown generally in FIG. 9;

FIG. 17 is a flow diagram of steps performed by the Infrastructure API Support Component to update an active database;

FIG. 27 is a flow diagram of steps performed by the Transaction Manager Component to send messages to the Infrastructure API Support Component to set triggers in the active database;

FIG. 28 is a flow diagram of steps performed by the Transaction Manager Component to send signalling messages to the telecommunications network;

FIG. 29 is a flow diagram of the steps performed by the Transaction Manager Component to send signalling messages to the telecommunications network;

FIG. 30 is a flow diagram of steps performed by the Transaction Manager Component when receiving an "INFORM" signalling message from the telecommunications network;

FIG. 31 is a flow diagram of steps performed by the Transaction Manager Component when receiving signalling messages, other than an "INFORM" signalling message, from the telecommunications network; and FIG. 32 is a flow diagram of the steps performed by the Transaction Manager Component when receiving signalling messages, other than the "INFORM" signalling message, from the telecommunications network.

DETAILED DESCRIPTION OF THE PREFERRED IMPLEMENTATION

Reference will now be made in detail to the preferred implementation of the present invention as illustrated in the accompanying drawings. Whereever possible, the same reference numbers will be used throughout the drawings and the following description to refer to the same or like parts.

The present invention provides the capability for applications to send and receive network calls and to store the building blocks of network calls, including multiple objects and relationships between the objects. It also provides monitoring of the stored objects and relationships, which includes signalling applications of changes in the stored objects and relationships. By using multiple objects to represent network calls, multiparty multimedia network calls can be easily initiated, modified, or released.

Applications send and receive network calls by specifying the calls in terms of objects and their relationships. The details of the communications network operations necessary to initiate, modify, or release the network calls are left to the present invention.

The present invention provides the capability to interface with applications and to manage resources used, for example, in multimedia multiparty communications. The Application Programming Interface ("API") allows independently developed applications at one platform to cooperate in controlling a session state, which includes the state of local resources (i.e., resources available to the platform) and telecommunication network resources.

A. The Major Components of System

Figure 1:
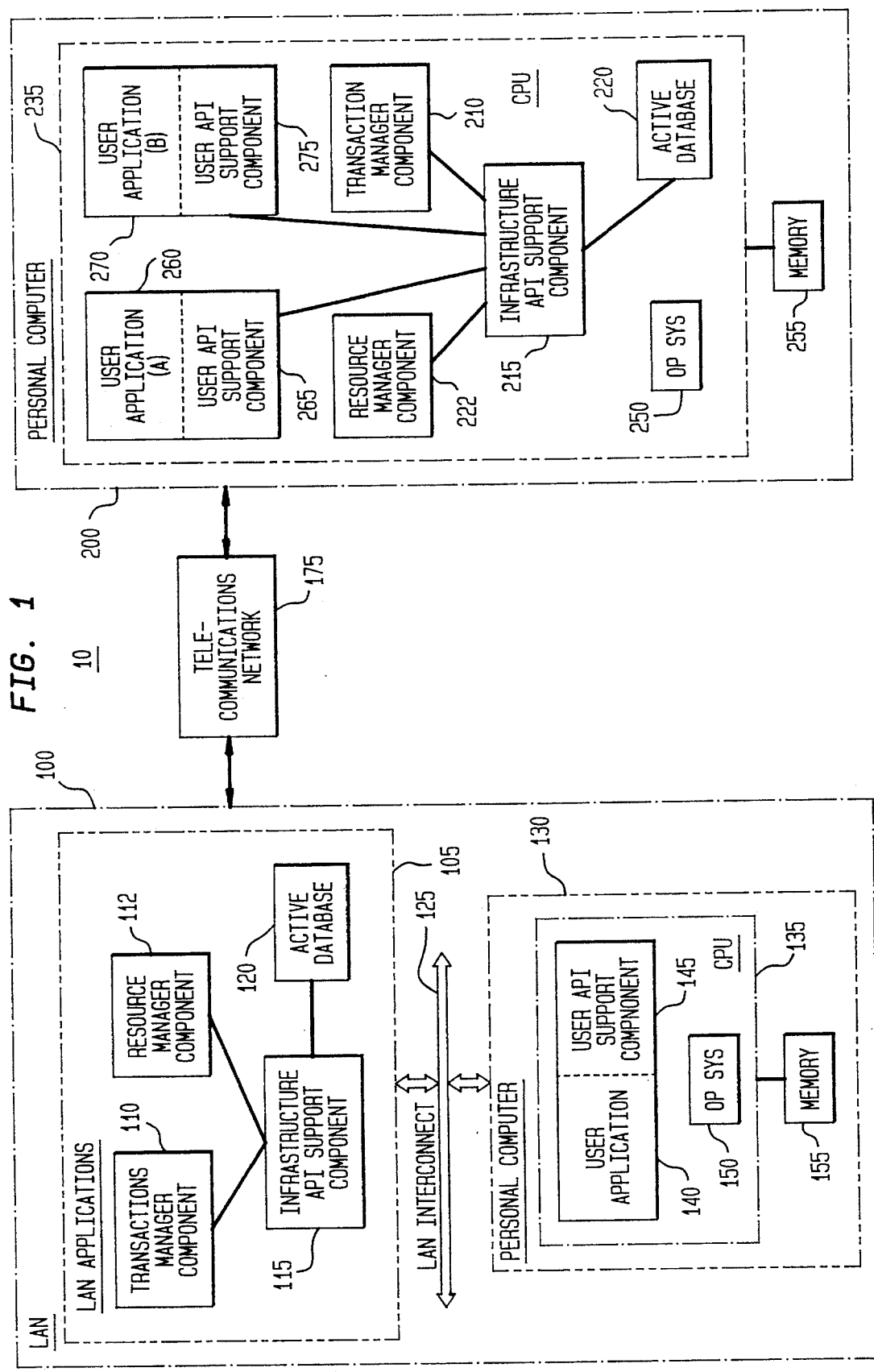
FIG. 1 is a block diagram of a system including the preferred implementation.

FIG. 1 illustrates a system 10 in which the present invention may be implemented. In FIG. 1, system 10 contains a LAN (local area network) 100 and a personal computer 200. LAN 100 is connected by a telecommunications network 175 to personal computer 200. LAN 100 and personal computer 200 can be either heterogenous or homogenous. For example, LAN 100 may be a UNIX-based network and the personal computer 200 may use the MS-DOS operating system. Alternatively, both the LAN 100 and personal computer 200 may use the MS-DOS operating system.

Telecommunications network 175 may include multimedia hardware, as explained below. LAN 100 may communicate with personal computer 200 via a protocol specified by telecommunications network 175. This protocol can create, modify, and delete multimedia multiparty calls.

LAN 100 includes a LAN interconnect 125 connecting LAN applications 105 and a personal computer 130. LAN interconnect 125 connects the applications, workstations, personal computers, including personal computer 130, in LAN 100.

LAN applications 105 include three components of the preferred implementation: Transaction Manager Component 110, Resource Manager Component 112, and Infrastructure API Support Component 115. LAN applications 105 also include an active database 120. LAN applications 105 may also include other applications that may be stored, run or displayed on any personal computer in LAN 100.

Personal computer 130 includes a CPU 135 and a memory 155. CPU 135 includes a user application 140 together with a User API Support Component 145. CPU 135 also includes operating system 150.

LAN applications 105 are illustrated separate from the personal computer 130 in the LAN 100 to show that Transaction Manager Component 110, Resource Manager Component 112, Infrastructure API Support Component 115, and active database 120 need not be physically located in the same personal computer as User API Support Component 145. In fact, Transaction Manager Component 110, Resource Manager Component 112, Infrastructure API Support Component 115, and active database 120 may be available to all personal computers connected in LAN 100, including personal computer 130. Also, although, user application 140 and User API Support Component 145 are shown as part of personal computer 130, they could be among the LAN applications 105 and available to all personal computers in the LAN 100.

The present invention may be used by personal computers in LAN 100 to communicate with each other, or by a single personal computer in LAN 100, like personal computer 130, to communicate with another personal computer outside the LAN 100, like computer 200. In the latter case, personal computer 130 in the LAN 100 would communicate with outside personal computer 200 via the telecommunications network 175. Alternatively, personal computer 130 in LAN 100 communicates directly with personal computer 200 via a conventional data connection instead of intermediate telecommunications network 175. This, however, would require certain modifications local to Transaction Manager Components 110 and 210. The details of these modifications are not important to an understanding of the present invention, however, so they will not be discussed.

Personal computer 200 includes a CPU 235 and a memory 255. CPU 235 includes user application (A) 260, user application (B) 270, Transaction Manager Component 210, Infrastructure API Support Component 215, active database 220, and Resource Manager Component 222. User applications (A) 260 and (B) 270 each have a corresponding User API Support Components 265 and 275, respectively, which are also included in CPU 235. The CPU 235 also includes operating system 250.

User applications 140, 260, and 270 may be off-the-shelf programs modified to work with the present invention, or specially-written programs to take advantage of the services provided by the present invention. For purposes of this description, user applications either invoke operations to be performed in accordance with this invention, or respond to invocations by components of the preferred implementation which may originate from other user applications. In the preferred implementation, the examples of user applications 140, 260 and 270 include applications capable of performing functions associated with multimedia multiparty communications.

Associated with the user applications 140, 260, and 270 are User API Support Components 145, 265, and 275, respectively. This association is illustrated by the dotted lines. The dotted lines also show that the User API Support Components 145, 265, and 275 are part of the preferred implementation and separate from the user applications 140, 260, 270, respectively. In one example, the User API Support Components 145, 265, and 275 may be program code in a library to be compiled with user applications 140, 260, and 270, respectively.

As illustrated in FIG. 1, only the Infrastructure API Support Components 115 and 215 can be connected directly to the active databases 120 and 220, respectively. This connection depends on the interface required to access the active databases 120 and 220. For example, the connection between components 115 and 120 may differ from the connection between components 215 and 220 because the active database 120 is one type of relational database and 220 is another type.

The interfaces are the same between the User API Support Components 145, 265, and 275 and the Infrastructure API Support Components 115 and 215, respectively; between the Resource Manager Components 112 and 222 and the Infrastructure API Support Component 115 and 215, respectively; and between the Transaction Manager Components 110 and 210 and the Infrastructure API Support Component 115 and 215, respectively. They are dictated by the protocol of the Infrastructure API Support Components 115 and 215.

In the preferred implementation, components 110, 112, 115, 210, 215, and 222 represent software processes which communicate with one another through standard interprocess communication mechanisms. Further, in the preferred implementation the user applications 140, 260, and 270 are also processes and the components 145, 265, and 275, respectively, are parts of those processes. While the Resource Manager Components 112 and 222, and the user applications 140, 260, and 270 (with each corresponding support component 145, 265, and 275, respectively) can be disconnected from the system, Infrastructure API Support Components 115 and 215 will preferably always be present in the system 10. Additionally, new applications can be added to the system 10 at any time.

Although this description discusses Transaction Manager Components 110 and 210 and Resource Manager Components 112 and 222, there may also be other "managers" communicating with the Infrastructure API Support Components 115 and 215. Managers are applications that oversee aspects of the active databases 120 and 220 and, in response to changes in active databases 120 and 220, further change the active databases 120 and 220 to assist user applications, for example, user applications 140, 260, and 270.

For example, a directory service manager may be connected to the Infrastructure API Support Component 115. When a user application 140 indicates that it wants to place a call to another party with the name of that party, without the telephone number, the directory service manager causes a change to the active database 120 to include the telephone number of the party to be called. This example shows how directory service manager must include functions correlate party names and their telephone numbers.

Operating systems 150 and 250 are standard operating systems which are tied to the corresponding CPUs 135 and 235. For example, operating system 150 and operating system 250 might both be MS-DOS. Though it is not illustrated in FIG. 1, a LAN operating system, such as WindowsNT™, could also be included among the LAN applications 105.

Memories 155 and 255 may be any type of storage device (e.g., magnetic storage or optical storage) and serve several functions. One function is, of course, to provide general storage for the associated personal computer 130 and 200. Another function is to store user applications 140, 260, and 270, components 110, 115, 120, 220, 210, 215, 265, and 275 and operating systems 150 and 250. In addition, memory 155 may contain information for the LAN, including applications and data that may be used by other personal computers, connected in LAN 100. For example, since personal computer 130 is part of the LAN 100, memory 155 may store one or more LAN Applications.

As mentioned above, telecommunications network 175 includes certain multimedia communications hardware to provide functions for multimedia, multiparty communications. Such functions may include mixing, combining, and transcoding sound, video, and data from different sources.

Figure 2:
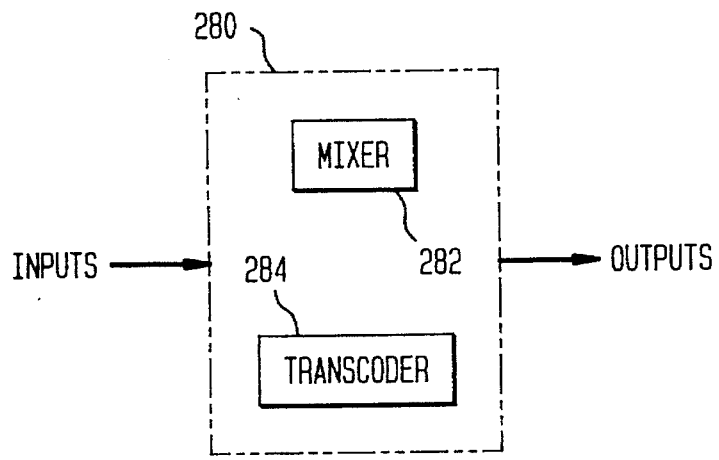
FIG. 2 is a block diagram of multimedia hardware that may be included in the personal computer and/or telecommunications network of FIG. 1.

FIG. 2 is a block diagram of multimedia communications hardware 280 the preferred implementation uses for multimedia, multiparty communications. Hardware 280 includes a mixer 282 and a transcoder 284. Mixer 282 combines multiple input signals into a single output signal and transcoder 284 performs format conversion, such as from digital video to NTSC analog video.

In one embodiment, telecommunications network 175 includes hardware 280, which may then be considered among the "network resources." Alternative configurations may also be possible. For example, personal computer 200 may include hardware 280. In this case, Resource Manager Component 222 would manage operations using hardware 280. Resource Manager Component 222 in this example may also manage other local resources in the personal computer 200, such as a camera or a speaker.

B. Database Architecture

Active databases 120 and 220 may be relational databases or some other type of databases, e.g., hierarchical databases. The functions of the active databases 120 and 220 may also be performed by a custom built means for storing and manipulating data as well as responding to manipulation of the data.

Active database 120 for the LAN 100 is among the LAN applications 105. Active database 120 is characterized as being similar to other types of LAN applications 105 because it includes not only data and relationships between the data, but also "trigger" information. Trigger information is defined as conditions or rules that signal events to be initiated when the data and/or relationships in the database change.

For example, the active database 120 may include a trigger that initiates a process to signal user application (A) 260 whenever data is added to the active database 120. Another trigger might initiate a process to signal user application (B) 270 under more specific conditions, i.e., whenever a specific change is made to the active database 220.

Similarly, the active database 220 for the personal computer 200 is illustrated in the CPU 235. This is because, while the data in the active database 220 is resident in the memory 255, the database is an "active" database.

The preferred implementation does not limit the number or types of triggers that active databases 120 and 220 may include. All user applications 140, 260, and 270, which may be of any type (including video conferencing applications, picture-in-picture applications, voice mail applications, etc.), may "register" triggers (via the Infrastructure API Support Components 115 and 215 and User API Support Components 145, 265, and 275, respectively) with the active databases 120 and 220, respectively. Additionally, components of the preferred implementation, such as Transaction Manager Components 110 and 210 and Resource Manager Components 112 and 222, may also register triggers. Registering triggers involves adding new triggers to the active databases 120 and 220.

For the most part active databases 120 and 220 represent both a "telecommunications network state" and a "local resource state." The telecommunications network state includes objects in the active database 120 or 220 that correspond to the different aspects of a call viewed by the telecommunications network. In contrast, the local resource state includes objects in the active database 120 or 220 that correspond to local resources. Throughout this description references to the "state of the active database" refer to both the telecommunications network state and the local resource state.

Active databases 120 and 220 include "objects." Each object has an identifier for identification and one or more attributes to represent some aspect of the object. For example, a "Party" object might include two attributes, the first identifying the name of the party and the second specifying the party's telephone number.

One skilled in the art will recognize that any type of representation for these objects may also be used. For example, the objects may be represented in a hierarchical database using another format. Further, while the present implementation uses certain object attributes, other attributes may also be added by, for example, user applications.

Figure 3:
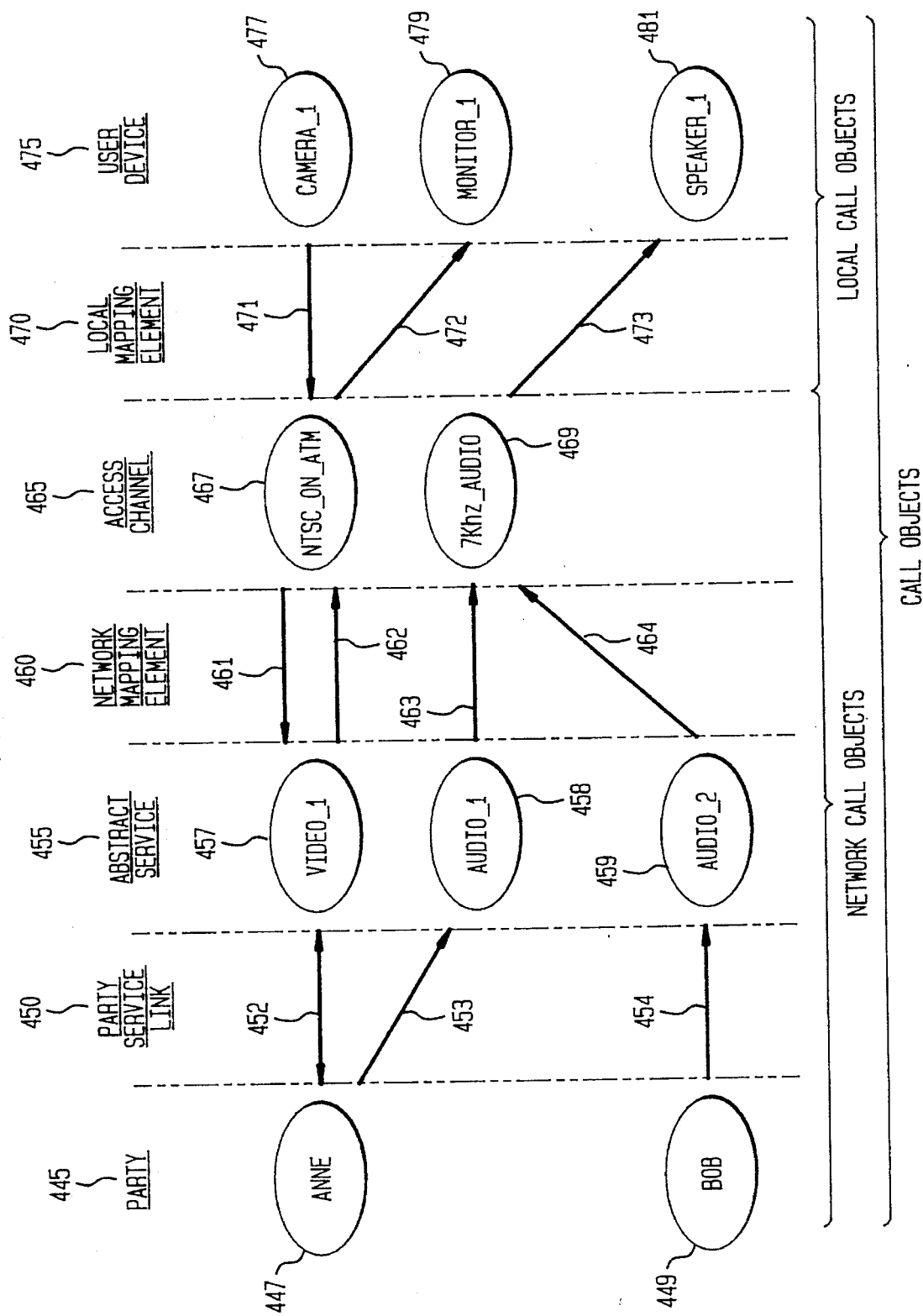
FIG. 3 is an illustration of the object-oriented call model used by the preferred implementation to represent different aspects of calls.

Among the types of objects included in the active databases 120 and 220 are "call objects" and "transaction objects." FIG. 3 illustrates examples of most of the call objects and their relationships. The call objects fall into eight types: Party Set (not shown), Party 445, Party Service Link 450, Abstract Service 455, Network Mapping Element 460, Access Channel 465, Local Mapping Element 470, and User Device 475.

Call objects represent aspects of "calls" in the active databases 120 and 220. Calls are communications between users with homogeneous or heterogeneous computers, or between other terminal equipment, for example, LAN 100 and personal computer 200. Calls may include multiple users and multimedia.

FIG. 3 also illustrates two categories of call objects: network call objects and local call objects. Network call objects represent aspects of calls related to a telecommunications network such as network 175 in FIG. 1, and local call objects represent aspects of calls related to hardware, including personal computer, LAN, telephone, etc., connected to the telecommunications network 175.

Network call objects include five types of objects: Party 445, Party Service Link 450, Abstract Service 455, Network Mapping Element 460, and Access Channel 465. These types of objects can be defined as follows:

| | |
|---|---|
| Party 445: | identifies an individual or entity in a call; |
| Party-Service Link 450: | defines the link between a Party 445 and an Abstract Service 455 being used in a call; |
| Abstract Service 455: | defines the medium of communication used in a call; |
| Network Mapping Element 460: | defines the link between an Abstract Service 455 and an Access Channel 465; and |
| Access Channel 465: | defines a telecommunications network endpoint that describes encoding as well as the physical and logical channels for a call. |

Active databases 120 and 220 also store one type of network call object not illustrated in FIG. 3, the Party Set object, which identifies a group of Party 445 objects in a call. These types of network call objects are described in greater detail in Steven Minzer, "A Signaling Protocol for Complex Multimedia Services," IEEE J. Select. Areas Comm., vol. 9, pp. 1383–1394, December 1991, which is incorporated herein by reference. Because this article uses different terminology for network call objects, the following translation relates the two terminologies:

| Party Set | → | Call |
|---|---|---|
| Party | → | Remote Vertex |
| Party Service Link | → | Connection Edge |
| Abstract Service | → | T-connection |
| Network Mapping Element | → | Mapping Element |
| Access Channel | → | Access Edge |

Local call objects include Local Mapping Element objects 470 and User Device objects 475. Local Mapping Element objects 470 represent links between Access Channel 465 objects and User Device 475 objects. User Device objects 475 define terminal equipment, such as cameras, monitors, microphones, or speakers, used in a call.

FIG. 3 shows a possible relationship between objects. A Party object 447, with the object identifier "anne," is related to a Party Service Link object 452, which in turn is related to the Abstract Service object 457. The object identifier for the Abstract Service Link object 457 is "video_1." Similarly, the Abstract Service object 457 is related to a Network Mapping Element object 461, which in turn is related to an Access Channel object 467. The object identifier for the Access Channel object 467 is "ntsc_on_atm." The Access Channel object 467 is related to a Local Mapping Element 471, which in turn is related to a User Device object 477. The object identifier for the User Device Object 477 is "camera_1."

Additionally, the Party Service Link objects 450, Network Mapping Element objects 460, and Local Mapping Element objects 470 also have object identifiers. For example, the object identifier for the Party Service Link object 452 is "high_quality_video"; the object identifier for the Network Mapping Element object 461 is "up_video_net_1"; and the object identifier for the Local Mapping Element object 471 is "up_video_loc."

The remaining objects illustrated in FIG. 3, Party 445, Party Service Link 450, Abstract Service 455, Network Mapping Element 460, Access Channel 465, Local Mapping Element 470, and User Device 475 also have object identifiers, as shown in FIG. 3. Object 449 has an identifier "bob," object 458 has an identifier "audio_1," object 459 has an identifier "audio_2," object 469 has an identifier "7khz_audio," object 479 has an identifier "monitor_1," and object 481 has an identifier "speaker_1." Further, the remaining Party Service Link objects 453 and 454, Network Mapping Element objects 462, 463, and 464, and Local Mapping Element objects 471, 472 and 473 also have object identifiers. These object identifiers are as follows:

| Party Service Link object 453 | → | "high_quality_audio" |
|---|---|---|
| Party Service Link object 454 | → | "low_quality_audio" |
| Network Mapping Element object 462 | → | "down_video_net_1" |
| Network Mapping Element object 463 | → | "down_audio_net_1" |
| Network Mapping Element object 464 | → | "down_audio_net_1" |
| Local Mapping Element object 471 | → | "up_video_loc" |
| Local Mapping Element object 472 | → | "down_video_loc" |
| Local Mapping Element object 473 | → | "down_audio_loc" |

The preferred implementation uses transaction objects to represent transactions on call objects. These transactions differ from the database transactions, which those skilled in the art will recognize as involving updates on a database. Transactions on call objects comprise a set of operations to be performed as a unit altogether or not at all. These operations are called "atomic actions." For example, the transactions of call objects include sets of operations for setting up, connecting, disconnecting, creating, deleting, modifying, etc. calls.

As illustrated in FIG. 4, relationships between objects in the active databases 120 and 220 are represented in a system table 300. System table 300 includes the object identifiers which, in most cases, refer to other tables in active databases 120 and 220 that contain the attributes of objects.

The object identifiers in the system table 300 are categorized into two groups: "call object identifiers" and "transaction object identifiers." In the preferred implementation, call object identifiers identify "call objects" (see FIG. 3) and transaction object identifiers identify "transaction objects."

In FIG. 4, system table 300 includes two types of transaction object identifiers: TransactionID 310 and TransType 320. Object identifiers included among the TransactionID type 310 of object identifiers are the unique identifiers for transaction objects. Object identifiers included among the TransType type 320 of object identifiers describe requested actions to "ADD" objects to and "DELETE" objects from active databases 120 and 220. In addition, "none" object identifiers anywhere in the system table 300 refer to a null object, which means there is no corresponding object in the active databases 120 and 220.

A call is represented in the system table 300 by one or more related tuples. A tuple is a set of object identifiers and attributes. In FIG. 4, for example, the set of tuples 397 includes four related tuples 397a, 397b, 397c, and 397d that collectively represent a call. The example call of FIG. 4 corresponds to the call objects shown in FIG. 3. Each tuple 397a, 397b, 397c, and 397d consists of one or more related object identifiers. For example, the tuple 397a includes of a Network Mapping Element identifier "up_video_net_1," an Access Channel identifier "ntsc_on_atm," a Local Mapping Element identifier "up_video_loc," a User Device identifier "camera_1," etc. Additionally, multiple tuples may include the same object identifiers.

When referring to types of object identifiers in the system table 300 or other tables in the active database 120 or 220, this application uses upper case, e.g., "TransactionID." When referring to object identifiers in the system table 300, this application uses lower case, e.g., "transID_1." Thus, for example, "transID_1" is an object identifier of the type "TransactionID."

The object identifiers in the system table 300 relate as follows:

(1) TransactionID 310 (and TransType 320) identifiers relate to call object identifiers in an n-to-n relationship. Multiple transaction object identifiers can relate to multiple call object identifiers.

(2) Party Set object 330 identifiers relate to Party 340 object identifiers in a 1-to-n relationship.

(3) A Party object 340 identifier relates to Party Service Link object 350 identifiers in a 1-to-n relationship.

(4) Party Service Link object 350 identifiers relate to Abstract Service 360 object identifiers in an n-to-1 relationship.

(5) An Abstract Service object 360 identifier relates to Network Mapping Element object 370 identifiers in a 1-to-n relationship.

(6) Network Mapping Element object 370 identifier relates to an Access Channel object 380 identifier in an n-to-1 relationship.

(7) An Access Channel object 380 identifier relates to Local Mapping Element object 390 identifiers in a 1-to-n relationship.

(8) Local Mapping Element object 390 identifier relates to a User Device object 395 identifier in an n-to-1 relationship.

For example, as illustrated in the system table 300, a call represented by the tuples 397 includes the following object identifiers:

| | |
|---|---|
| TransactionID: | none |
| TransType: | none |
| Party Set: | call_1 |
| Parties: | anne |
| | bob |
| Party Service Links: | high_quality_video |
| | high_quality_audio |
| | low_quality_audio |
| Abstract Service: | video_1 |
| | audio_1 |
| | audio_2 |
| Network Mapping Element: | up_video_net_1 |
| | down_video_net_1 |
| | down_audio_net_1 |
| | down_audio_net_2 |
| Access Channel: | ntsc_on_atm |
| | 7Khz_audio |
| Local Mapping Element: | up_video_loc |
| | down_video_loc |
| | down_audio_loc |
| User Device: | camera_1 |
| | monitor_1 |
| | speaker_1 |

As illustrated in FIG. 4, the Party Set identifier defines the tuples in the system table 300 that make up a call. For example, "call_1" is the Party Set identifier in each of the tuples 397a–d constituting the call represented by the tuple 397.

Since the system table 300 represents a view from a specific platform, a user of the platform is implicitly included in the calls represented in the system table 300. The system table 300 preferably does not include a Party object identifier for the user.

As stated above, the call object identifiers in the example tuples 397 and in the system table 300 correspond to the objects illustrated in FIG. 3. For example, the Party Service Link object identifier "up_video_loc" in tuple 397a corresponds to the Local Mapping Element object 471 of FIG. 3, which also has the "up_video_loc" identifier.

In this example, tuples 397 show a call including the parties "anne" and "bob." "Anne" is linked to the Abstract Service "video_1" via the Party Service Link "high_quality_video" and to an Abstract Service "audio_1" via the Party Service Link "high_quality_audio." "Bob" is linked to the Abstract Service "audio_2" via the Party Service Link "low_quality_audio."

Network Mapping Element "up_video_net_1" links the Abstract Service "video_1" to the Access Channel "ntsc_on_atm," Network Mapping Element "down_video_net_1" links the Abstract Service "video_1" to the Access Channel "ntsc_on_atm," Network Mapping Element "down_audio_net_1" links the Abstract Service "audio_1" to the Access Channel "7Khz_audio," and Network Mapping Element "down_audio_net_2" links the Abstract Service "audio_2" to the Access Channel "7Khz_audio."

Further, Local Mapping Element "up_video_loc" links Access Channel "ntsc_on_atm" to User Device "camera_1," Local Mapping Element "down_video_loc" links Access Channel "ntsc_on_atm" to User Device "monitor_1," and Local Mapping Element "down_audio_loc" links Access Channel "7Khz_audio" to User Device "speaker_1".

Figure 5:
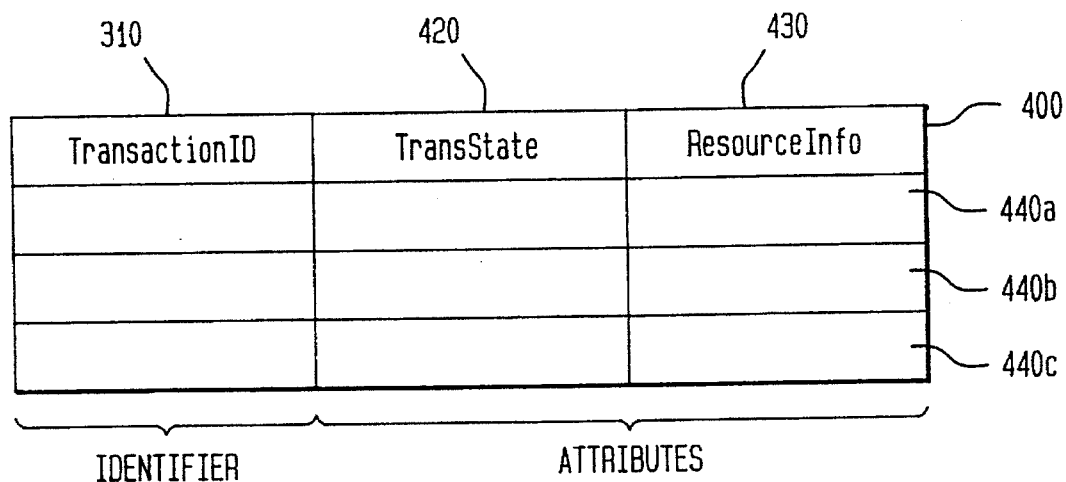
FIG. 5 illustrates a transaction table used by the preferred implementation to manage transactions in the active database.

Each object identifier in the system table 300, except TransType identifiers, represents a unique object. Accordingly, object identifiers in the system table 300 are also used to relate object attributes stored in other tables in the active database 120 or 220. These other tables have the form of an identifier column on the left followed by a set of attribute columns. An object identifier identifies a row of the table. One example of such a table is illustrated in FIG. 5, which shows a transaction table 400. The active databases 120 and 220 include the transaction table 400, which contains the transaction ID and object attributes corresponding to the type TransactionID 310.

Object attributes in the transaction table generally concern different aspects of a transaction, that is, actions to be performed on the system table 300.

In addition to TransactionID 310 identifiers, the transaction table 400 also includes TransState 420 attributes that identify the "state" of a transaction. Transactions to set up, connect, disconnect, etc. calls require the telecommunications network 175 to perform atomic actions. These atomic actions are part of a well-known concurrency control protocol that enables multiple parties to set up multiparty calls. Thus, the types of TransState 420 object identifiers include: "BEGIN," "READY," "FAIL," and "ABORT," where each of these attributes represent the state or status of an atomic action. These TransState 420 attributes correspond to the two-phase commit protocol that is an industry standard. This protocol is explained in CCITT recommendation X.852, Commitment, Concurrency, and Recovery ("CCR"). This invention is not limited to using the CCR protocol. TransState 420 attributes will be explained further below with reference to the operation of the preferred implementation.

The transaction table 400 also includes ResourceInfo 430 attributes identifying information used by the Resource Manager Components 112 and 222. ResourceInfo 430 attributes will be discussed further below with reference to the functions of the Resource Manager Components 112 and 222.

Similar to the system table 300, transaction table 400 includes tuples with TransactionID 310 object identifier, and TransState 420 and ResourceInfo 430 attributes. Rows 440a–c in table 400 show that table 400 generally includes tuples, because rows 440a–c contain an appropriate identifier and related attributes. In operation, however, if there are no transaction object identifiers to be included in table 400, that table would not have rows 440a–c because without tuples table 400.

The preferred implementation includes active databases 120 and 220. The active databases 120 and 220 may be conventional relational databases with the trigger capabilities described above. These capabilities include performing some action in response to a change to the stored data, specifically, the system table 300. Changes to the system table 300 cause certain conditions, which are stored as "triggerConditions" in the active databases 120 and 220, to be "true." When triggerConditions are "true," the active databases 120 and 220 inform the Infrastructure API Support Component 115 and 215, respectively. The Infrastructure API Support Components 115 and 215 then notify either a user application, e.g., user application 140, the Transaction Manager Components 110 and 210, Resource Manager Components 112 and 222, or another manager.

The Infrastructure API Support Components 115 and 215 can identify which application or manager to notify based on "triggerIDs" stored in the active databases 120 and 220, which are sent to the Infrastructure API Support Components 115 and 215 with the notification that the triggerConditions are true. Further details on triggerIDs and triggerConditions will be discussed below.

C. The API Service

(1) General Operation

Figure 9:
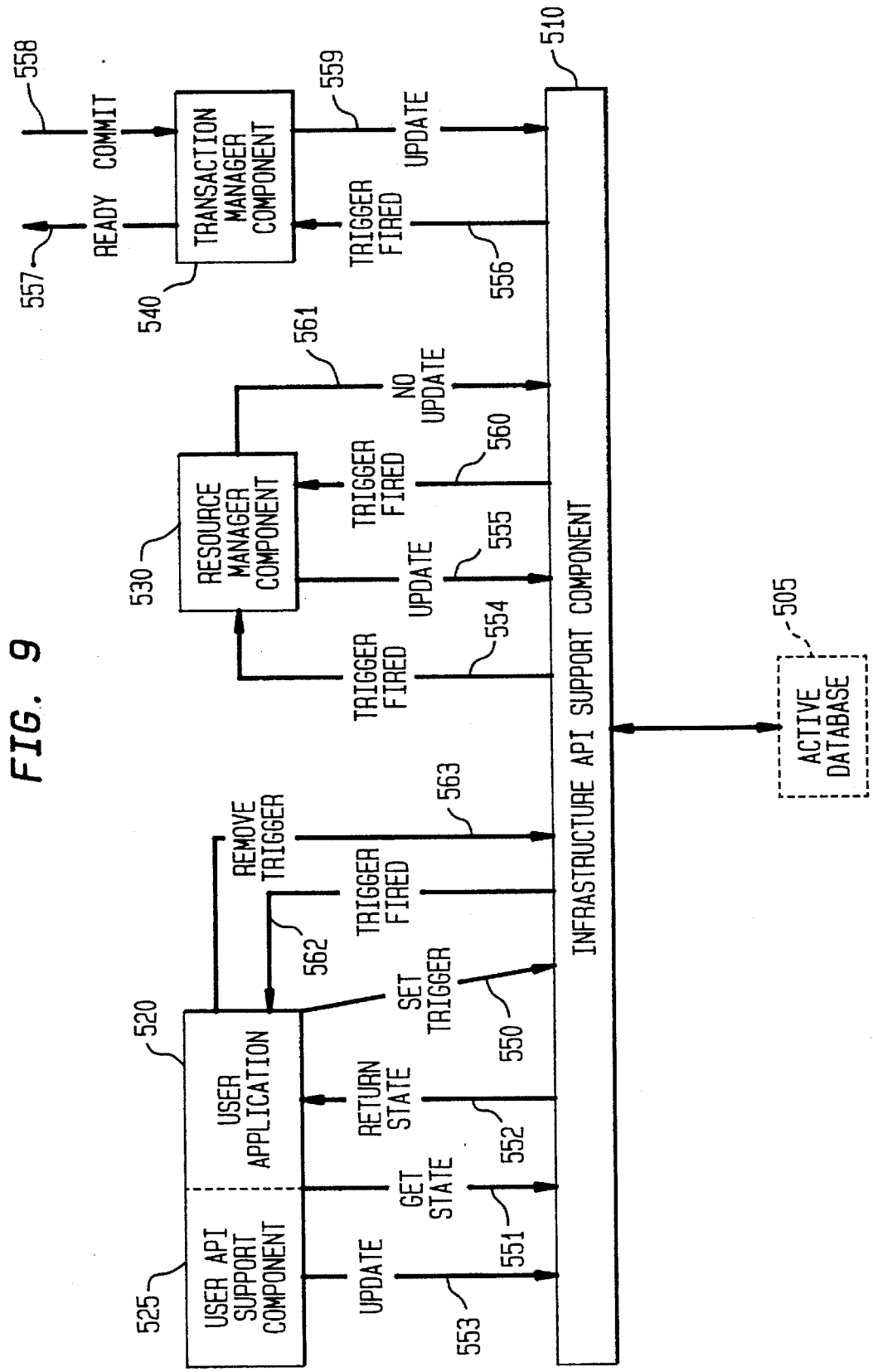
FIG. 9 is a flow diagram of the general operation of the preferred implementation to create, modify, or delete a call.
Figure 10:
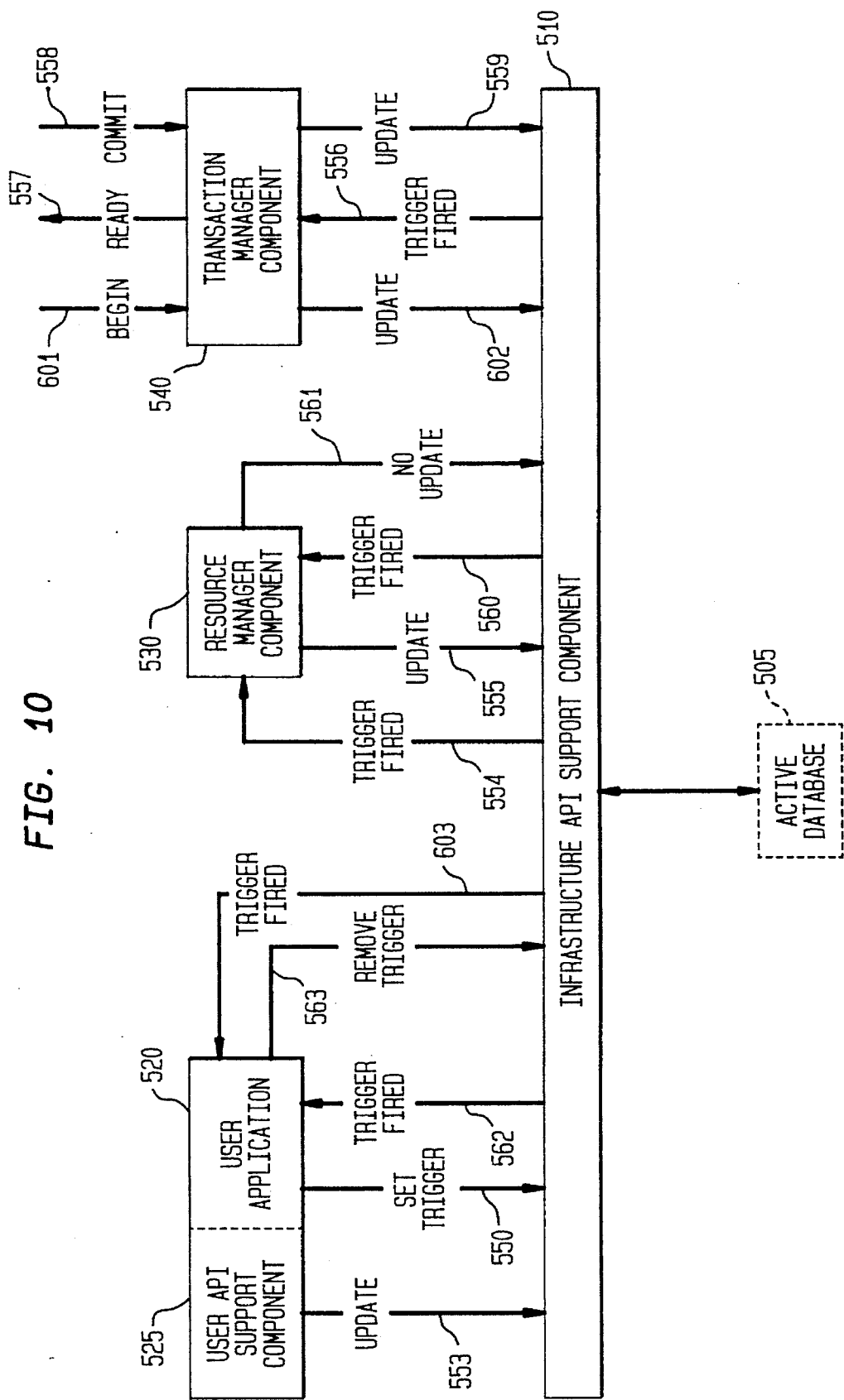
FIG. 10 is a flow diagram of the general operation of the preferred implementation to receive a call.

FIGS. 9 and 10 are diagrams of the different components of the preferred implementation and of the flow of information between those components. FIG. 9 illustrates the flow of information for creating a call, while FIG. 10 illustrates the flow of information for receiving a call. The flow of information for modifying or deleting a call is the same as that for creating a call. Objects are added to the active database 505 when creating a call and removed from the active database 505 when deleting a call. When modifying a call, objects are both added and removed.

In FIGS. 9 and 10, the user application 520 and the User API Support Component 525 are illustrated as a single box separated by a dotted line. The dotted line separating 520 and 525 shows that the User API Support Component 525 is a separate part that is also part of the preferred implementation. FIGS. 9 and 10 also show the User API Support Component 525, Resource Manager Component 530, Transaction Manager Component 540, and Infrastructure API Support Component 510. Those components correspond to the components in FIG. 1 that have the same names. These components, the active database 505, and the user application 520 are connected with lines and arrows illustrating the flow of information during operation of the implementation. Before explaining the flow, it is useful to gain a further understanding of how the active database 505 is updated according to the processes of this implementation.

a. How an Application Updates the Active Database

When the user application 520 wishes to update the active database 505, for example to add or delete call objects, it begins the updating process by sending an AppUpdate message to the User API Support Component 525. Details on how the Infrastructure API Support Component processes AppUpdate messages are specified below with reference to FIG. 23.

In general, the AppUpdate message includes a transactionID, a unique identifier for the transaction that the user application 520 wants the Infrastructure API Support Component 510 to execute. The AppUpdate message also includes resourceInfo which may, for example, be used to pass application-specific information related to the transactionID to the Resource Manager Component 530. Additionally, the AppUpdate message includes the current state of the active database, which is now considered the old state (OS) of the active database 505 because the user application 520 also sends in the AppUpdate message a new state (NS) of the active database 505. This NS is the state that the user application 520 wishes the active database 505 to be in after the update process. However, the AppUpdate message does not directly update the active database 505 to state NS.

Network call objects included in NS that are also related to the transactionID are in a pending state until the active database 505 is updated to reflect confirmation from the telecommunications network. Since the active database 505 contains the call objects, it cannot be updated to state NS until confirmation is received from the telecommunications network via the Transaction Manager Component 540. Rather, after receiving the AppUpdate message, the User API Support Component 525 creates a superstate (NS'), which includes a copy of the system table from state OS plus tuples that indicate the changes requested by the user application 520 that are part of a pending transaction.

FIGS. 6 and 7 illustrate exemplary system tables 700 and 800 for purposes of explaining how the User API Support Component 525 creates NS' to indicate the creation of call objects as part of a pending transaction. The table 700 in FIG. 6 will be considered the OS and the table 800 in FIG. 7 will be considered the NS. In other words, the user application 520 specifies that the active database 505 should reflect changes between the OS (table 700 in FIG. 6) and NS (table 800 in FIG. 7), so that the active database 505 will look like NS after the update process.

In FIG. 6, the system table 700 includes fields 710a and 710b for TransactionID identifiers and fields 720a and 720b for TransType identifiers. The remaining fields 725a and 725b in the system table 700 include call object identifiers (identifiers 330–395 illustrated in FIG. 4), which have been compressed into a single field 725a and 725b for purposes of illustration.

The identifiers in the fields 710a, 710b, 720a, 720b, 725a, and 725b comprise tuples 730 and 740, respectively. The tuple 730 includes a TransactionID identifier "none" in field 710a, a TransType attribute "none" in field 720a and call object identifiers represented by "A" 735 in field 725a. The tuple 740 includes a TransactionID identifier "none" in field 710b, a TransType attribute "none" in field 720b, and call object identifiers represented by "B" 745 in field 725b. The "none" identifier and attribute in fields 710a–b and 720a–b indicate that there is no pending transaction in the table 700.

FIG. 7 illustrates table 800, which is substantially the same as table 700 in FIG. 6. The table 800 includes the tuple 730, which is the same as the tuple 730 in table 700. The "none" entries in fields 810a and 820a of table 800 correspond to the "none" in fields 710a and 720a of table 700. The call object identifiers represented by "A" 735 are in field 825a.

The table 800 in FIG. 7, however, does not include tuple 740. Instead, table 800 in FIG. 7 includes tuple 850. The tuple 850 includes a "none" in fields 810b and 820b, which indicate that there is no transaction in the tuple 850. The tuple 850 also includes call object identifiers represented by "C" 845 in field 825b.

Figure 8:
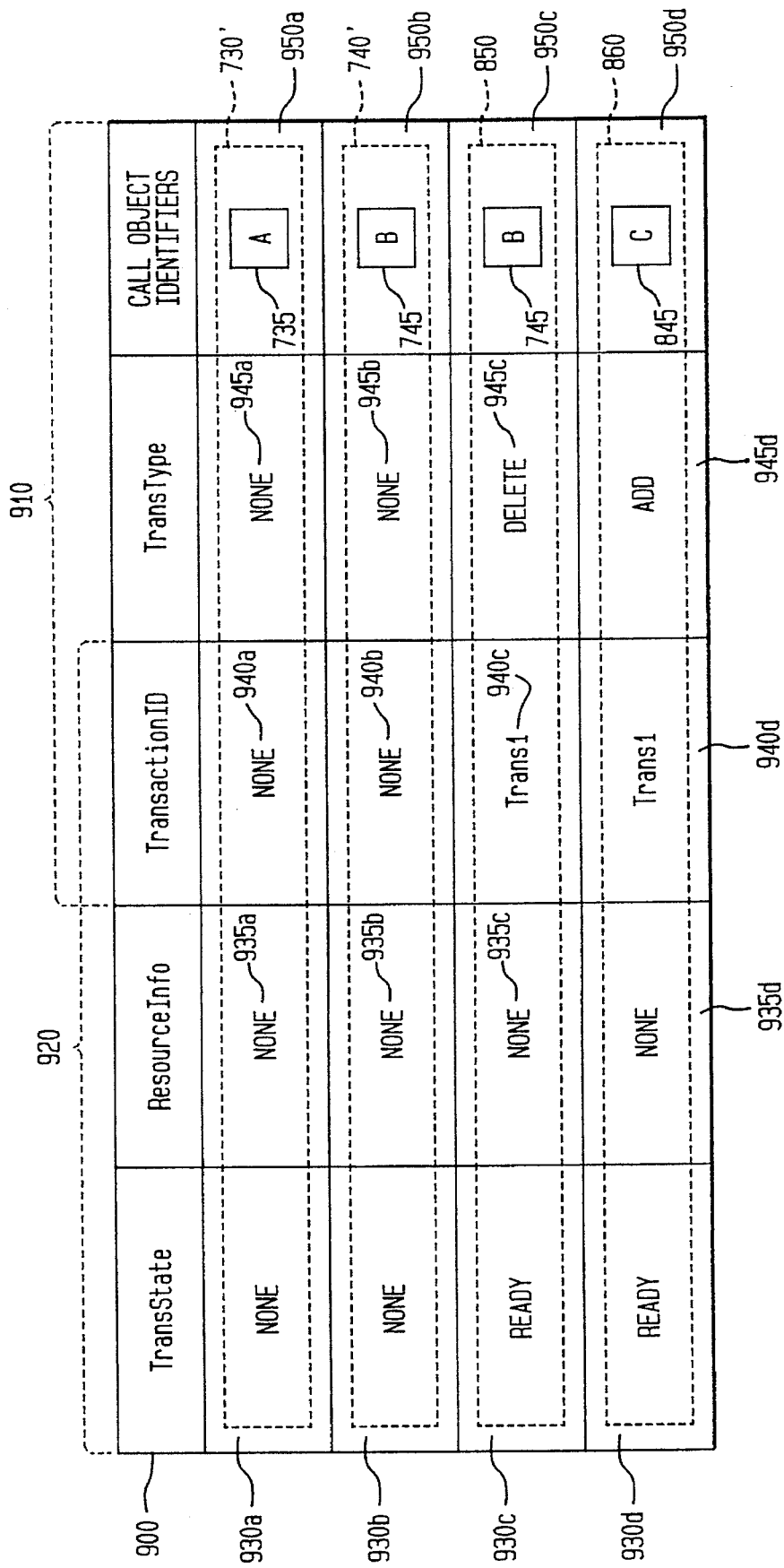

FIG. 8 shows the NS' that is generated during the update process from the OS (table 700) in FIG. 6 and the NS (table 800) in FIG. 7. To better illustrate NS', FIG. 8 shows a super-table 900 comprised of the system table 700 from both FIGS. 6 and 7 joined with their corresponding transaction tables by their TransactionIDs. This is shown in super-table 900, with the transaction table being part 920 and the system table being part 910.

The super-table 900 includes fields for the TransactionID identifiers 940a–d, TransType attributes 945a–d and the call object identifiers 950a–d, as well as fields for TransState 930a–d and ResourceInfo 935 a–d attributes. The TransState and ResourceInfo attributes would normally be in a separate transaction table with TransactionID identifiers corresponding to the system table.

The tuples 730' and 740' in the super-table 900 correspond to tuples 730 and 740 in table 700 of FIG. 6. These tuples 730 and 740 represent OS. The only items added in the super-table 900 for the tuples 730 and 740 are fields 930a–b and 935a–b, which are the TransState and ResourceInfo fields, respectively, corresponding to the call object identifier "A" for tuple 730 and "B" 745 for tuple 740. Like in the table 700, these fields 930a–b and 935a–b indicate no transaction ("none").

On the other hand, tuples 850 and 860 in the super-table 900 do reflect a pending transaction. The TransState field 930c for tuple 850 is "READY," the ResourceInfo field 935c for tuple 850 is "none," the TransactionID field 940c for tuple 850 is "trans1," and the TransType field 945c for tuple 850 shows "DELETE." The call object identifier field 950c in tuple 850 is "B" 745, the same as "B" 745 in field 725b of FIG. 6. Similarly, the tuple 860 is added to the super-table 900 and differs from the table 800 in FIG. 7. The TransState field 930d for tuple 860 is "READY," the ResourceInfo field 935d for tuple 860 is "none," the TransactionID field 940d for tuple 860 is "trans1," and the TransType for tuple 860 is "ADD." Additionally, the call object identifier field 950d in tuple 860 is the same as that in field 825b of FIG. 6.

In the super-table 900 tuples 730 and 740 are not part of the transaction, that is, they do not have a transactionID. Instead, they contain a "none" in the TransactionID fields 940a and 940b. The third tuple 850 and fourth tuple 860 are part of a transaction, as shown by the same identifier "trans1" in the TransactionID fields 940c and 940d. This transaction is in the "READY" state, as shown by the attribute "READY" in the TransState fields 930c and 930d. The TransType attributes in fields 945c and 945d indicate that tuple 850 with the call object identifier "B" 745 is pending deletion and tuple 860 is pending addition. Further details on how the AppUpdate process forms NS' for the OS and NS will be explained below. In general, the preferred implementation uses NS' to determine what steps need to be taken to get from state OS to state NS.

b. Creating, Modifying and Deleting Calls

For the purpose of illustration, the description below discusses modifying a call with reference to FIG. 9. However, the same message flow is used for creating and deleting calls. This message flow is also part of the message flow for receiving a call as described below with reference to FIG. 10.

FIGS. 11–15 show an example of the progression of states of a system table and a transaction table when an application joins a call that is already in progress. The call in progress is a point-to-point audio call, represented in FIG. 11. Two local user devices are used in the call. The devices are a microphone "mike_1" and a speaker "speaker_1." No transaction is in progress. In the course of explaining FIG. 9 this example will be used for illustration.

The process of modifying a call begins with the user application 520 creating a unique transactionID and sending a SetTrigger message 550 to the Infrastructure API Support Component 510 with a unique triggerID and a priority 0. Also sent are triggerConditions, which indicate the user application 520 should be sent a TriggerFired message when the last tuple in the system table with transactionID is deleted. The SetTriggerReturn message which returns status ("success" or "fail") for the SetTrigger message 550 is not shown in FIG. 9. Next, the user application 520 sends a GetState message 551 to the Infrastructure API Support Component 510. In this message, the user application 525 requests a copy of the current state (CS) of the active database 505. The Infrastructure API Support Component 510 controls all access to the active database 505.

In response to a GetState message 551, the Infrastructure API Support Component 510 obtains the CS and returns a ReturnState message 552 to the user application 520, including the CS of the active database 505.

The user application 520 then sends an AppUpdate message to the User API Support Component 525 with OS, NS, the TransactionID identifier, and ResourceInfo attribute resourceInfo. In the example, the AppUpdate message only adds the following call objects: the transactionID is "trans1" and the resourceInfo is set to "MINIMIZE_BAND-WIDTH" (see FIG. 13). This resourceInfo attribute indicates that the Resource Manager Component 530 should try to minimize the amount of bandwidth which is used on the link between the terminal equipment and the telecommunications network.

Figure 12:
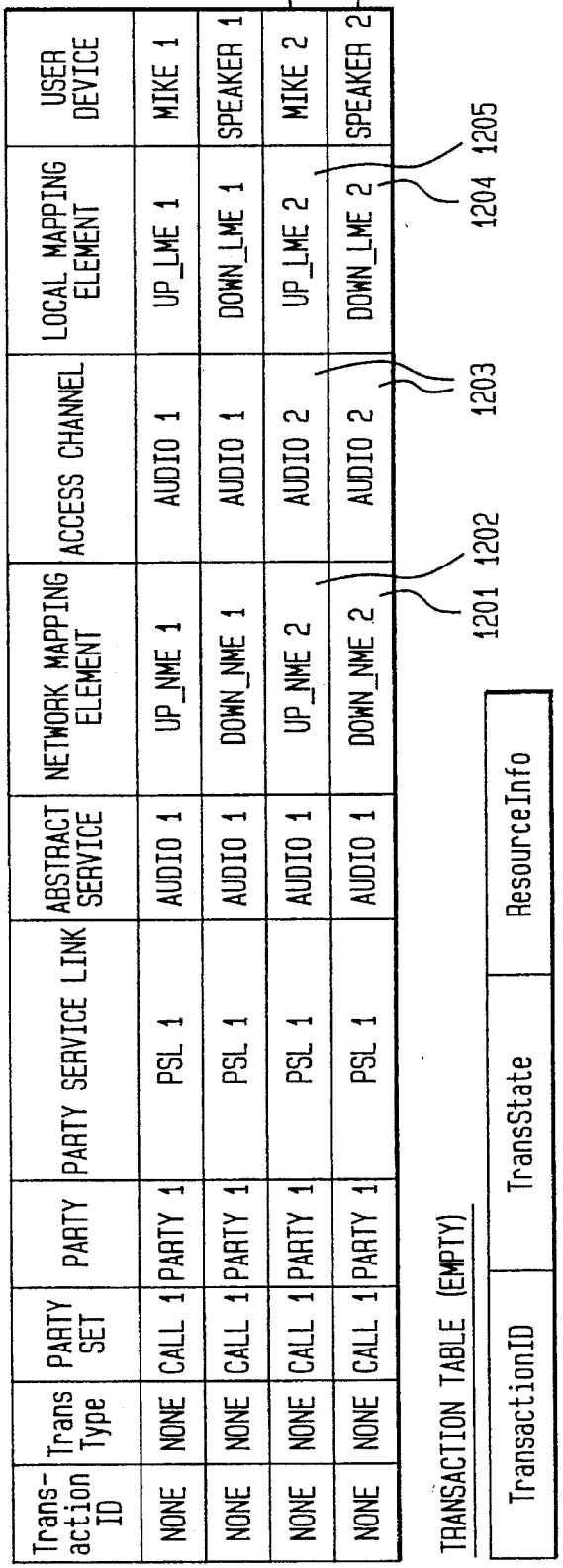
Figure 16:
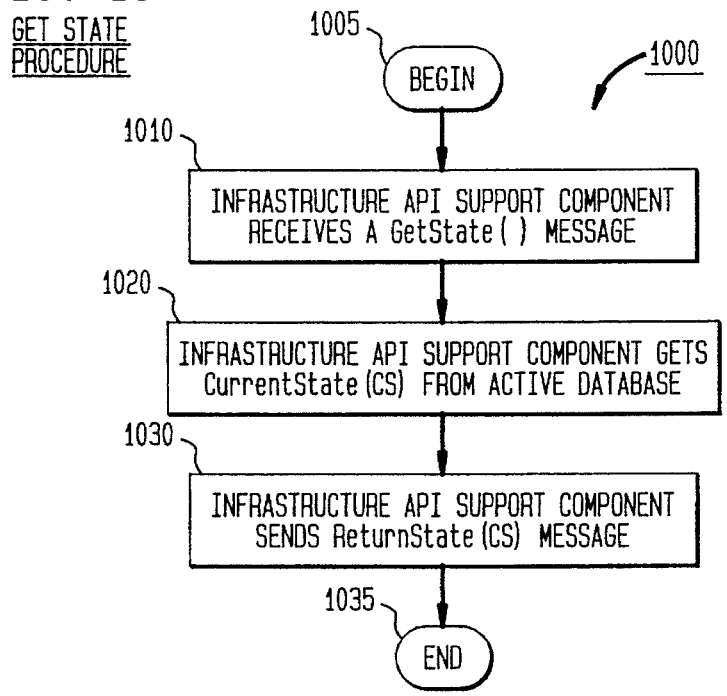
FIG. 16 is a flow diagram of steps performed by an Infrastructure API Support Component to get the state of an active database.
Figure 18:
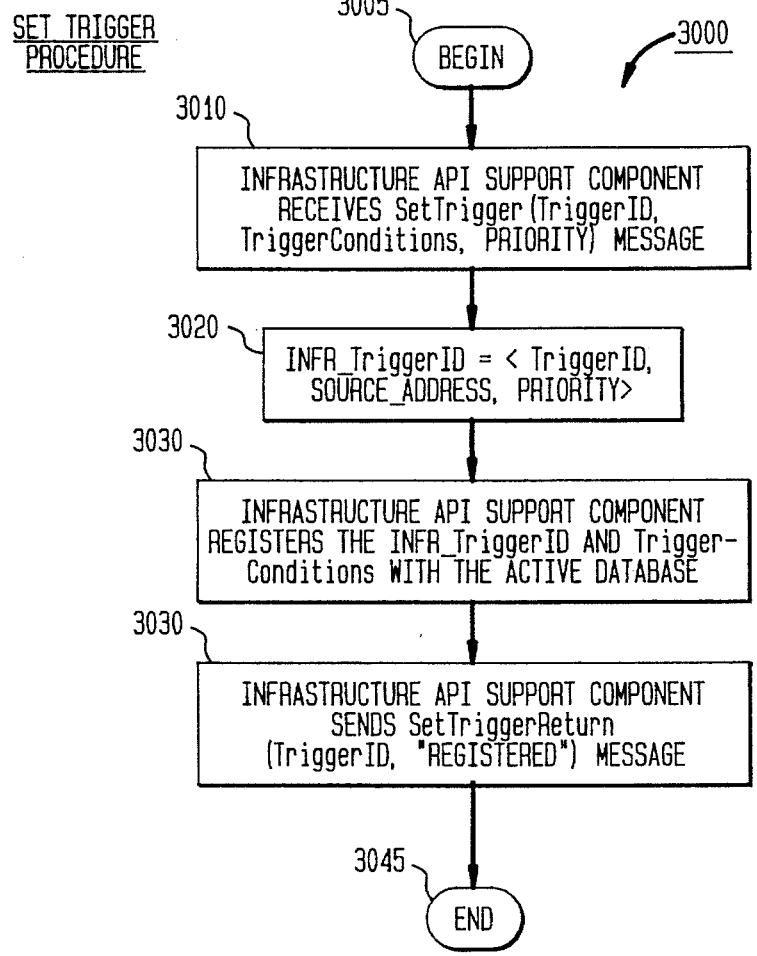
FIG. 18 is a flow diagram of steps performed by the Infrastructure API Support Component to set triggers in an active database.
Figure 19:
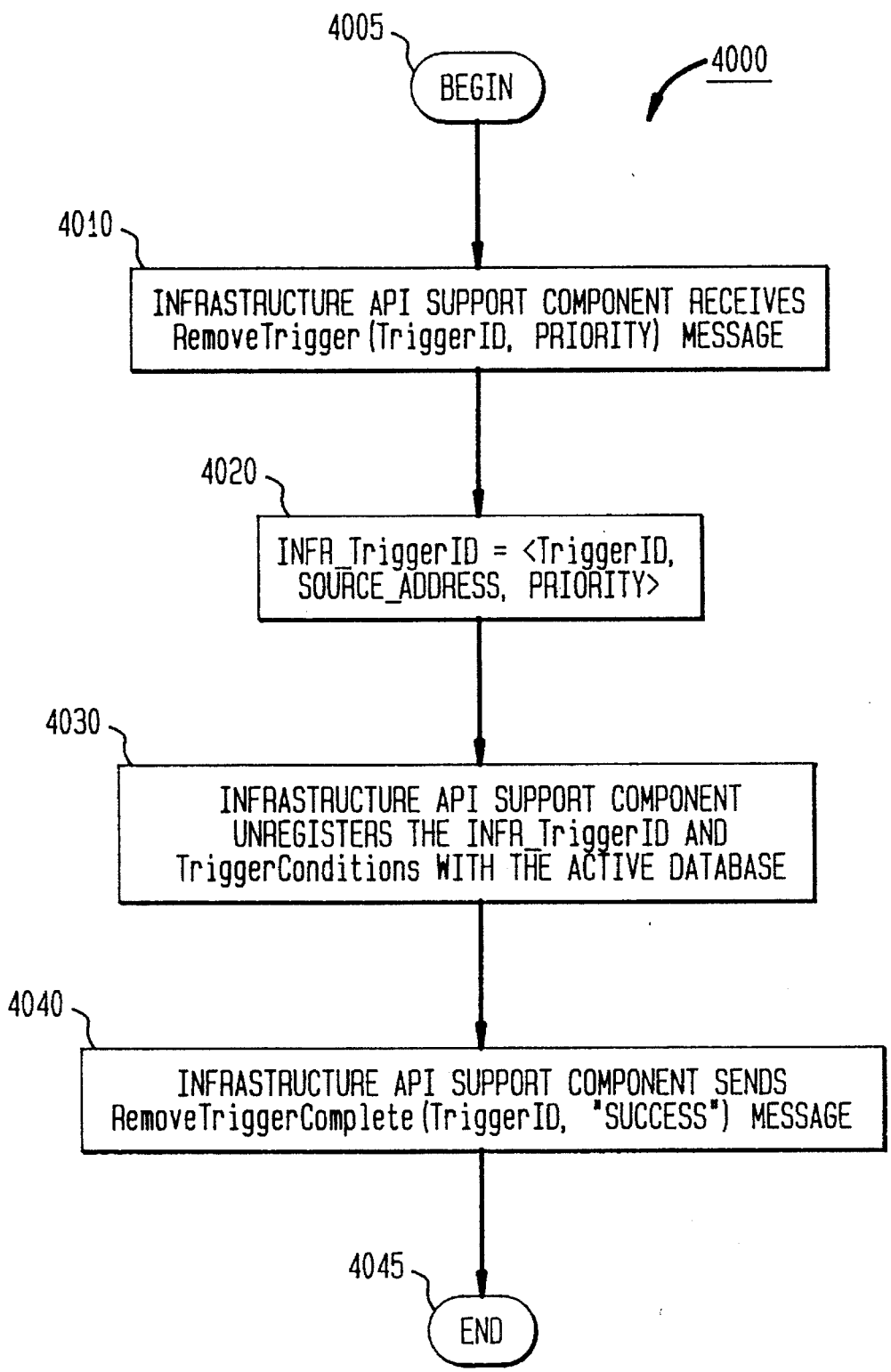
FIG. 19 is a flow diagram of steps performed by the Infrastructure API Support Component to remove triggers from an active database.

In the example, FIG. 12 shows the NS that the user application 520 sends with the AppUpdate message. It includes the OS from FIG. 11 plus new tuples which represent that the application wishes to add several new call objects. These new call objects are represented by Network Mapping Element identifiers 1201 and 1202, Access Channel identifier 1203, Local Mapping Element identifiers 1204 and 1205, and User Device identifiers 1206 and 1207. The User Device identifiers represent that the application joining the call wishes to have its own microphone and speaker.

As a result of the AppUpdate, the User API Support Component 525 sends Update message 553, including OS and NS', to the Infrastructure API Support Component 510. FIG. 13 shows the NS' in the example. The Infrastructure API Support Component returns a ReturnUpdate message (not shown in FIG. 9) with the update return status ("succeed" or "fail") to the User API Support Component 525. If "fail" is returned, the User API Support Component 525 sends a GetState message (not shown in FIG. 9) to the Infrastructure API Support Component, modifies the CS to create NS as above, and tries sending the Update message again. This set of steps, "GetState, modify state, retry Update," can be used by any sender of an Update message when a ReturnUpdate message returns the status "fail." Eventually the update will succeed.

When the Update message 553 succeeds, it causes two triggers to fire in the active database 505. These are the triggers that were set by the Resource Manager Component 530 and Transaction Manager Component 540 when they initialized. Because the priority of the Resource Manager Component's 530 trigger is higher than that of the Transaction Manager Component 540, the Infrastructure API Support Component 510 first sends a TriggerFired message 554 to the Resource Manager Component 530 with OS, CS, and the triggerID that was registered with the trigger. At this time, the Resource Manager Component 530 has the opportunity to modify the tuples in the active database 505, including those associated with the transaction.

One reason for the Resource Manager Component 530 to modify the tuples is that it may need to modify object attributes to assign specific local resources. For example, a User Device object may contain an attribute DeviceType which has the value "VCR." The Resource Manager Component 530 would find and allocate an available VCR, for example "vcr1," and set an attribute Device of the User Device object to the value "vcr1." This could later be used by the application to see which VCR was allocated. In the example illustrated in FIG. 14, the user specifies the Device attribute (i.e., "mike_2" and "speaker_2") when it requests to join the call, so the Resource Manager Component 530 simply allocates the microphone and speaker corresponding to "mike_2" and "speaker_2."

Another reason for the Resource Manager Component 530 to modify the tuples is that it may need to modify object relationships to take advantage of local resources. In the example, the resourceInfo related to the transactionID in NS has the value "MINIMIZE_BANDWIDTH."

FIG. 14 shows that the Resource Manager Component 530 removed Network Mapping Element identifiers "upNME_2 1301," "downNME_2 1302," and Access Channel identifier "audio_2 1303" in order to use a local mixer rather than a network-based mixer. In this case, the Resource Manager Component 530 allocated a local mixer and may have placed information about the mixer in the affected Local Mapping Element objects.

After setting OS equal to CS and setting NS to include resource related changes to the call objects, the Resource Manager Component 530 sends an Update message 555 with OS and NS to the Infrastructure API Support Component. It then receives back a ReturnUpdate message (not shown in FIG. 9) with the status of the Update. Upon receiving the Update message 555, the Infrastructure API Support Component 510 delivers the pending TriggerFired message 556 to the Transaction Manager Component 540 together with OS, CS, and the triggerID.

Upon receiving the TriggerFired message 556, the Transaction Manager Component 540 compares OS and CS and sees that new call objects have been created. It sends a "READY" message 557 to the telecommunications network (not shown), requesting that the telecommunications network update the telecommunications network state to reflect the creation of the pending call objects. In the example illustrated in FIG. 14, only the local call objects changed, so the no change is required in the telecommunications network. Thus, in the example, the telecommunications network immediately returns a "COMMIT" message 558. (The Transaction Manager Component 540 could be optimized to eliminate the need for sending any message at all to the telecommunications network when the telecommunications network state does not need to be changed.) In the more general case, for example when parties are added to a call, the telecommunications network sends messages to the other parties requesting confirmation (via the "BEGIN" message), and the telecommunications network does not return a "COMMIT" message to the Transaction Manager Component 540 until all the called parties have responded with "READY" messages.

Upon receiving the "COMMIT" message 558, the Transaction Manager Component 540 modifies its current view of the state of the active database 505, which is CS, to create NS. It then changes the tuples that are related to the transaction so that those call objects pending creation are no longer pending and those pending deletion are deleted. The Transaction Manager Component 540 then sends the Update message 559 to the Infrastructure API Support Component 570 with CS and NS, after which it receives back a ReturnUpdate message (not shown in FIG. 9) with the status of the update process. In the example illustrated in FIG. 15, the information related to the transaction identifier "trans1" has been removed from all tuples—meaning that the transaction is complete.

The Update message 559 causes two triggers to fire in the active database 505. The higher priority trigger, which is for the Resource Manager Component 530, is delivered first via a TriggerFired message 560 to the Resource Manager Component 530. Included in the message are the triggerID, OS, and CS.

Upon receiving the TriggerFired message 560, the Resource Manager Component 530 sees that the resource related tuples that had been part of a transaction are no longer pending (ie. the TransactionID identifier is "none").

The Resource Manager Component 530 then activates the resources. In the example, it turns on the mixer, speaker, and microphone. Finally, it sends a NoUpdate message 561 to the Infrastructure API Support Component to indicate that it has completed its trigger related processing.

Upon receiving the NoUpdate message 561, the Infrastructure API Support Component delivers the pending TriggerFired message 562 to the user application 520. The user application 520, seeing that no tuples contain the transactionID, realizes that the transaction is complete and sends the RemoveTrigger message 563 to the Infrastructure API Support Component together with the triggerID and priority. The RemoveTrigger message 563 results in the active database 505 removing the trigger associated with the transaction. This ends the process of creating, modifying, or deleting a call.

It is important to note that the user application 520 may not need to directly send and receive the GetState, AppUpdate, and trigger-related messages described above. Instead, the user application 520 may use, for example, libraries (not shown) that include procedures that interface between the user application 520 and the procedures for sending and receiving the GetState, AppUpdate, and trigger-related messages. Such libraries may also include conventional relational database manipulation procedures that assist the user application 520 in manipulating the database representation of the call state without executing any of the procedures for sending and receiving the GetState, AppUpdate, and trigger-related messages. For example, a conventional relational database "select( )" procedure can be used to find all tuples in CS that have a particular transactionID in the TransactionID field. Such procedures are powerful tools for manipulating the call state represented by CS.

In the preferred implementation, CS represents a snapshot of the complete active database 505. In another implementation, CS could represent a snapshot of a subset of the active database 505. In this case, the GetState message would include "subSpec," a specification of the subset of the active database 505 that should be returned in the ReturnState message. Additionally, the Infrastructure API Support Component 510 would only return the tuples in the active database 505 that are selected by subSpec. For example, the subSpec might specify that only tuples with a transactionID equal to "trans1" should be returned in the ReturnState message.

A component that sends an AppUpdate or Update message (discussed below) would include the same subSpec that was used in the GetState message when sending an AppUpdate message or Update Message. In other words, the AppUpdate message and the Update message would have to be modified to carry subSpec in addition to the information they carry in the described implementation.

Upon receiving an Update message the Infrastructure API Support Component would select the tuples belonging to the subSpec from the active database and compare them to the OS received in the Update message. If they were the same, the Infrastructure API Support Component 510 would replace them in the active database 505 with the NS from the Update message. If they were different, the update process would fail.

D. Receiving a Call

As shown in FIG. 10, the process of receiving a call begins with the Transaction Manager Component 540 receiving a "BEGIN" message 601 from the telecommunications network. Upon receiving the "BEGIN" message 601, the Transaction Manager Component 540 generates a unique transactionID. It then creates NS equal to OS plus new tuples. The new tuples reflect the change of telecommunications network state that is indicated in the "BEGIN" message 601. The new tuples all have the transactionID in the TransactionID field and the TransState attribute set to "BEGIN." The TransType attribute may be "ADD" or "DELETE," depending on how the telecommunications network state was changed. After creating NS, the Transaction Manager Component 540 sends an Update message 602 to the Infrastructure API Support Component 510 with OS and NS, and then receives back a ReturnUpdate message (not shown in FIG. 10) with the status of the Update.

The Update message 602 from the Transaction Manager Component 540 causes a trigger previously set by the user application 520 to fire in the active database 505. As explained above, applications wishing to receive calls register triggers when they initialize. For example, an application might register with priority 0 to receive a trigger whenever a tuple with "BEGIN" in the TransType field is added to the active database 505.

The Infrastructure API Support Component 510 sends a TriggerFired message 603 to the user application 520 together with the triggerID, OS, and CS. Upon receiving the TriggerFired message 603, the user application 520 determines the tuples that were affected by the Update (CS OS) and extracts the transactionID from them. It then either ignores the incoming transaction (perhaps because it is not capable of answering that type of call or another application is better suited), rejects the incoming transaction by sending a ChangeTransState message with transactionID and a new transaction state of "FAIL," or accepts the incoming transaction, as described below.

To accept the incoming transaction, the user application 520 follows the flow described above for "Creating, Modifying, or Deleting Calls" FIG. 9. This is illustrated in FIG. 10 by the same message flow lines as those illustrated in FIG. 9. Further, the order of the flow from this point is the same as the order described with reference to FIG. 9. The one difference between the above description and the remaining flow for accepting a call is that instead of generating a new transactionID, the user application 520 uses the transactionID of the incoming transaction. (Also, FIG. 9 shows a GetState message 551 and a ReturnState message 552 which are not shown in FIG. 10. These are actually optional in that they are only performed in an attempt to ensure that the user application 520 has an up-to-date snapshot of the active database 505. An up-to-date snapshot is necessary for a successful Update message 553.) As in the case of creating or modifying a call, the user application 520 may add call objects to the CS before sending the AppUpdate message to the Infrastructure API Support Component 510. For example, these call objects may include User Device objects specifying the terminal equipment, e.g., a telephone, to be used in the call. As in the case of creating or modifying a call, the Resource Manager Component 530 would perform resource allocation based on this information.

(1) DETAILED OPERATION

For purposes of explaining the detailed operations of the preferred implementation, FIGS. 16–32 include a number of logical instructions that use the syntax of the "C" programming language. For example, "==" is used in instructions for specifying comparisons. Thus, "if x==y" means "if x is equal to y." Additionally, the notation "->" is used to refer to attributes or identifiers related to other identifiers. For example, "transID-->transState" means the TransState attribute related to or identified by the TransactionID "transID."

a. The Infrastructure API Support Component

Figure 20:
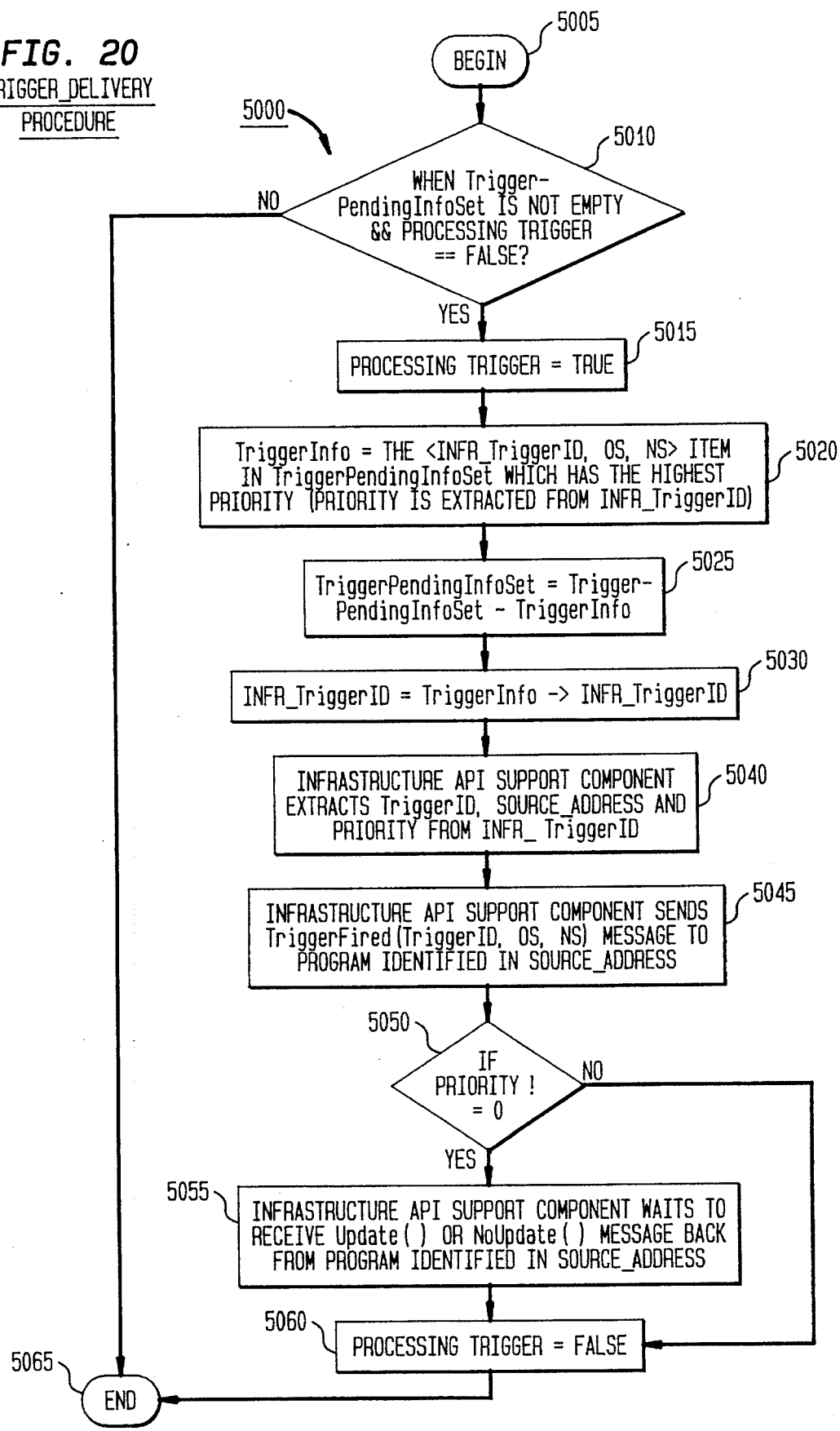
FIG. 20 is a flow diagram of steps performed by the Infrastructure API Support Component to deliver triggers fired by an active database.

FIGS. 16–20 contain flow diagrams of procedures performed or called by the Infrastructure API Support Component 510 of FIGS. 9 and 10. The five procedures performed by the Infrastructure API Support Component 510 are called GetState 1000 (FIG. 16), Update 2000 (FIG. 17), Set_Trigger 3000 (FIG. 18), Remove_Trigger 4000 (FIG. 19), and Trigger_Delivery 5000 (FIG. 20). In general, the Infrastructure API Support Component 510 is in a "wait" state. In this wait state the Infrastructure API Support Component 510 waits for input messages. It then responds to those messages by executing one of the procedures 1000, 2000, 3000, 4000, and 5000 illustrated in FIGS. 16–20.

Apart from the Trigger_Delivery 5000 procedure, the procedures performed by the Infrastructure API Support Component 510 generally operate in a "server" style in that they receive a message from a "client" and then send a response message back to the same client.

(i) GetState

The GetState procedure 1000 begins (step 1005 in FIG. 16) when the Infrastructure API Support Component 510 receives a GetState message (step 1010). As explained above, the GetState message comes from the user application 520. By sending this message, the user application 520 requests the Infrastructure API Support Component to return a copy of the current state (CS) of the active database. As explained above, CS is a snapshot of the active database. While FIGS. 9 and 10 only show the user application 520 sending GetState messages, in circumstances not illustrated in those figures the Resource Manager Component 530, the Transaction Manager Component 540, or other components may also send GetState messages.

After receiving the GetState message (step 1010), the Infrastructure API Support Component 510 gets the CS from the active database 505 (step 1020). The details of exactly how the Infrastructure API Support Component 510 queries the active database for purposes of obtaining the CS are well known to those Skilled in the art. After the Infrastructure API Support Component 510 obtains the CS from the active database 505, it sends a ReturnState message to the user application 520 (step 1030). The CS, which the Infrastructure API Support Component 510 obtains from the active database 505, is returned in the ReturnState message.

(ii) Update

The Update procedure 2000 begins (step 2005 in FIG. 17) when the Infrastructure API Support Component 510 receives an Update message (step 2010). The Update procedure is "non-reentrant" in that it may not begin processing a message until the previous message is completely processed. As illustrated in FIGS. 9 and 10, the User API Support Component 525, Resource Manager Component 530, and the Transaction Manager Component 540 all send Update messages. With the Update message, the sender (525, 530, or 540) includes an OS and an NS. As explained above, the OS is the old state of the active database 505, or a snapshot of the active database 505 previously received by the sender (525, 530, or 540). The NS is what the sender (525, 530, or 540) wants the active database 505 to look like after it is updated by the Infrastructure API Support Component 510.

After receiving the Update message (step 2010), the Infrastructure API Support Component 510 gets the CS from the active database 505 (step 2020). After the Infrastructure API Support Component 510 obtains the CS from the active database (step 2020), it compares the OS from the sender (525, 530, or 540) with the CS from the active database 505 (step 2030). This comparison (step 2030) ensures that the sender (525, 530, or 540) always knows the state of the active database 505 prior to the update.

If OS is equal to ("=") CS (step 2030), then the Infrastructure API Support Component 510 performs step 2040, which includes seven parts. First, the Infrastructure API Support Component 510 sets OS to be equal to CS, and, second, it sets CS equal to NS. Third, the Infrastructure API Support Component 510 updates the active database 505 with CS. In other words, the Infrastructure API Support Component 510 updates the active database 505 to reflect NS. This update may cause trigger conditions in the active database 505 to be true, in which case the active database 505 fires the triggers associated with the trigger conditions.

Fourth, the Infrastructure API Support Component 510 receives from the active database 505 a set of trigger identifiers ("Infr_TriggerIDs") from the active database 505. The set of Infr_TriggerIDs correspond to the trigger conditions that became true after the update to the active database 505. If no trigger conditions became true the set of trigger identifiers returned to the Infrastructure API Support Component 510 would be empty.

In the fifth part of step 2040, the Infrastructure API Support Component 510 sets a variable "triggerSet" equal to the set of Infr_TriggerIDs from the active database 505. Then, for each trigger ("infr_TriggerID") in the triggerSet, the Infrastructure API Support Component 510 sets another variable, "triggerPendingInfoSet," equal to the same variable plus the infr_TriggerID, OS, and NS for that infr_TriggerID. In other words, the triggerPendingInfoSet is a set of items, where each item contains an Infr_TriggerID from the active database and the OS and NS associated with that Infr_TriggerID. The triggerPendingInfoSet stores information about all the triggers that have fired and are waiting to be delivered by the Infrastructure API Support Component to the component that set the trigger. As explained below with reference to FIG. 20, and the Trigger_Delivery procedure 5000, the Infrastructure API Support Component 510 uses the triggerPendingInfoSet to send, in the appropriate order, "TiggerFired" messages to the appropriate one of the user application 520, Resource Manager Component 530, and Transaction Manager Component 540 that previously caused the Infrastructure API Support Component 510 to register the infr_triggerID and corresponding trigger conditions in the active database 505 (see Set_Trigger procedure 3000 in FIG. 18).

Finally, the Infrastructure API Support Component 510 sends an UpdateReturn message to the sender (525, 530, or 540) of the message received in step 2010. In this message, the Infrastructure API Support Component 510 indicates "success," which informs the sender (525, 530, or 540) that the Infrastructure API Support Component 510 successfully completed the process of updating the active database. After completing step 2040, the Infrastructure API Support Component 510 is done performing the steps of the Update procedure 2000 (step 2055).

If in step 2030 CS is not equal to OS, then the Infrastructure API Support Component 510 sends an UpdateReturn message to the sender (525, 530, or 540) of the message received in step 2010 (step 2050). In this message, the Infrastructure API Support Component 510 indicates "fail," which informs the sender (525, 530, or 540) that the Infrastructure API Support Component 510 did not successfully complete the process of updating the active database 505. After completing step 2050, the Infrastructure API Support Component 510 is done performing the steps of the Update procedure 2000 (step 2055).

One example of when CS will not be equal to OS is when the active database 505 was caused to be updated by another user application or component between the time that the sender (525, 530, or 540) sent a GetState message to the Infrastructure API Support Component 510 (and received the CS in return), and when the same sender (525, 530, or 540) sent the Update message. Of course the sender (525, 530, or 540) can then send another GetState message to the Infrastructure API Support Component 510 followed by another Update message in an effort to have the Infrastructure API Support Component 510 update the active database 505 to reflect the NS. Thus, the sender (525, 530, or 540) can eventually succeed in its effort to update the active database 505.

(iii) Set_Trigger

The Set_Trigger procedure 3000 begins (step 3005 in FIG. 18) when the Infrastructure API Support Component 510 receives a Set_Trigger message (step 3010). As illustrated in FIGS. 5 and 6, the user application 520, Resource Manager Component 530, and the Transaction Manager Component 540 all send Set_Trigger messages.

With the Set_Trigger message, the sender (520, 525, 530, or 540) also sends "triggerID," "triggerConditions," and "priority." As explained above, the triggerID is a unique identifier for the trigger. The triggerConditions include the conditions specified by the sender (520, 525, 530, or 540) that indicate when the sender (520, 525, 530, or 540) wants to be notified by the Infrastructure API Support Component 510 of an event, e.g., when active database 505 has been updated in a specific way.

The priority included in the Set_Trigger message is how the sender (520, 525, 530, or 540) specifies to the Infrastructure API Support Component 510 the order in which the Infrastructure API Support Component 510 is to notify the senders 520, 525, 530, or 540, respectively. For example, the Resource Manager Component 530 might send a Set_Trigger message with number indicating a "high" priority to the Infrastructure API Support Component 510. This high priority informs the Infrastructure API Support Component 510 that the Resource Manager Component 530 is to be delivered a TriggerFired message (see Trigger_Delivery procedure 5000 of FIG. 20) before another sender, e.g., the user application 520. In this example, the priority for the trigger associated with the other sender (not the Resource Manager Component 530) may be "low." Priorities are specified as non-negative integers so 0 is the lowest priority.

The Infrastructure API Support Component 510 then sets infr_triggerID to be a composite (or concatenation) of the triggerID, source_address, and priority (step 3020). The source_address identifies the sender (520, 525, 530, or 540) of the Set_Trigger message. As described with reference to the Trigger_Delivery procedure 5000, the Infrastructure API Support Component 510 uses the source_address to send the TriggerFired message to the appropriate one of the senders (520, 525, 530, or 540).

Next, the Infrastructure API Support Component 510 registers the infr_Trigger and corresponding triggerConditions with the active database 505 (step 3030), and sends a SetTriggerReturn message to the sender (520, 525, 530, or

540) (step 3040). With the SetTriggerReturn message, the Infrastructure API Support Component 3040 also sends the triggerID and status value "registered," confirming that the triggerID, triggerConditions and priority received in step 3010 were "registered" with the active database 505.

The Infrastructure API Support Component 510 is then done processing the input Set_Trigger message with the steps of the Set_Trigger procedure 3000 (step 305).

(iv) Remove_Trigger

The converse of the Set_Trigger message is the Remove_Trigger message. The Remove_Trigger procedure 4000 begins (step 4005 in FIG. 19) when the Infrastructure API Support Component 510 receives a Remove_Trigger message (step 4010) from one of the components 520, 525, 530, or 540. With the Remove_Trigger message, the sender (520, 525, 530, or 540) also sends the triggerID and priority.

The Infrastructure API Support Component 510 then sets infr_triggerID to be a composite of the triggerID, source_address, and priority (step 4020). Like in the Set_Trigger message, the source_address in the Remove_Trigger message identifies the sender (520, 525, 530, or 540) of the message.

Next, the Infrastructure API Support Component 510 unregisters the infr_Trigger and corresponding triggerConditions with the active database 505 (step 4030), and sends a RemoveTriggerComplete message to the sender (520, 525, 530, or 540) (step 4040). Like with the SetTriggerReturn message, the Infrastructure API Support Component 3040 also sends, with the RemoveTriggerComplete message, the triggerID and a "success" status value, which confirms that the triggerID and corresponding triggerConditions received in step 4010 were "unregistered" from the active database 505. If the active database 505 does not have a matching Infr_Trigger, the RemoveTriggerComplete includes triggerID and a status "fail" (not shown).

The Infrastructure API Support Component 510 is then done processing the input Remove_Trigger message with the steps of the Remove_Trigger procedure 4000 (step 4045).

In the preferred implementation the Infrastructure API Support Component 510 recognizes when one of its clients (e.g., components 530 and 540 or user application 520) is no longer connected and executes the Remove_Trigger procedure 4000 to remove all triggers associated with that user application from the active database 505.

(v) Trigger_Delivery

The Trigger_Delivery procedure 5000 generally delivers a TriggerFired message for each trigger that fires in the active database 505. TriggerFired messages are delivered in order of trigger priority with priority 0 messages delivered last. To ensure that the component receiving the TriggerFired message has a chance to update the active database 505 state before the next TriggerFired message is sent, the Trigger_Delivery procedure 5000 waits for an Update message or a NoUpdate message before sending the next TriggerFired message. The only exception to this is triggers that have priority 0. For such triggers, the Trigger_Delivery procedure 5000 does not wait for an Update message or NoUpdate message.

The Trigger_Delivery procedure 5000 begins (step 5005 in FIG. 20) when the Infrastructure API Support Component 510 determines that the "triggerPendingInfoSet" is not empty and a flag (or variable) called "processingTrigger" is equal to false (step 5010). "processingTrigger" is initialized to "false" when the Infrastructure API Support Component 510 begins operation (not shown). The triggerPendingInfoSet was created in step 2040 of procedure 2000 (FIG. 17) discussed above. When triggerPendingInfoSet is not empty and ("&&") processingTrigger is false the Infrastructure API Support Component 510 performs the remaining steps 5015 to 5065 of the procedure 5000. When either one or both of the conditions is not true, the Infrastructure API Support Component 510 advances directly to step 5065 and does not perform the Trigger_Delivery procedure 5000. In other words, the procedure 5000 is an event driven procedure, which begins when the conditions specified in step 5010 are both true.

When the conditions specified in step 5010 are both true, the Infrastructure API Support Component 510 sets processingTrigger to "true" (step 5015). The Infrastructure API Support Component 510 then sets a variable named "triggerInfo" equal to the item in the set triggerPendingInfoSet that has the highest priority (step 5020). The triggerPendingInfoSet, which was described in the Update procedure 2000, includes a set of items. Each item includes an Infr_TriggerID from the active database and the OS and NS associated with it (see step 2040 of the Update procedure 2000 of FIG. 17). The Infrastructure API Support Component 510 identifies the item in the set triggerPendingInfoSet that has the highest priority by extracting the priority from each of the Infr_TriggerIDs.

Next, in step 5025, the Infrastructure API Support Component 510 deletes the entry now stored in triggerInfo from the triggerPendingInfoSet and then sets infr_TriggerID equal to the infr_TriggerID field in triggerInfo (step 5030).

The Infrastructure API Support Component 510 then extracts the triggerID, source_address, and priority from the infr_TriggerID (step 5040) and sends a TriggerFired message to the user application 520, User API Support Component 525, Resource Manager Component 530, or the Transaction Manager Component 540 identified in the source_address extracted in the previous step (step 5045).

If the priority (extracted in step 5050) does not equal ("!=") "0" then the Infrastructure API Support Component 510 waits, in step 5055, to receive an Update or NoUpdate message back User API Support Component 525, Resource Manager Component 530, or the Transaction Manager Component 540 identified in the source_address extracted in step 5040.

If the priority (extracted in step 5040) does equal "0" (step 5050) or after performing step 5055, the Infrastructure API Support Component 510 sets the variable processingTrigger equal to false (step 5060), and the Trigger_Delivery procedure 5000 is completed (step 5065). After the Infrastructure API Support Component 510 completes one pass through the steps 5015 to 5065, it may perform the same steps again, depending upon whether the triggerPendingInfoSet is empty. If it is empty, then the Infrastructure API Support Component 510 has no more triggers to deliver to the user application 520, Resource Manager Component 530, or Transaction Manager Component 540. Otherwise, more triggers need to be delivered, and the Infrastructure API Support Component 510 does this by performing the steps 5015 to 5065 until the conditions in step 5010 are both true.

b. The User API Support Component

Figure 21:
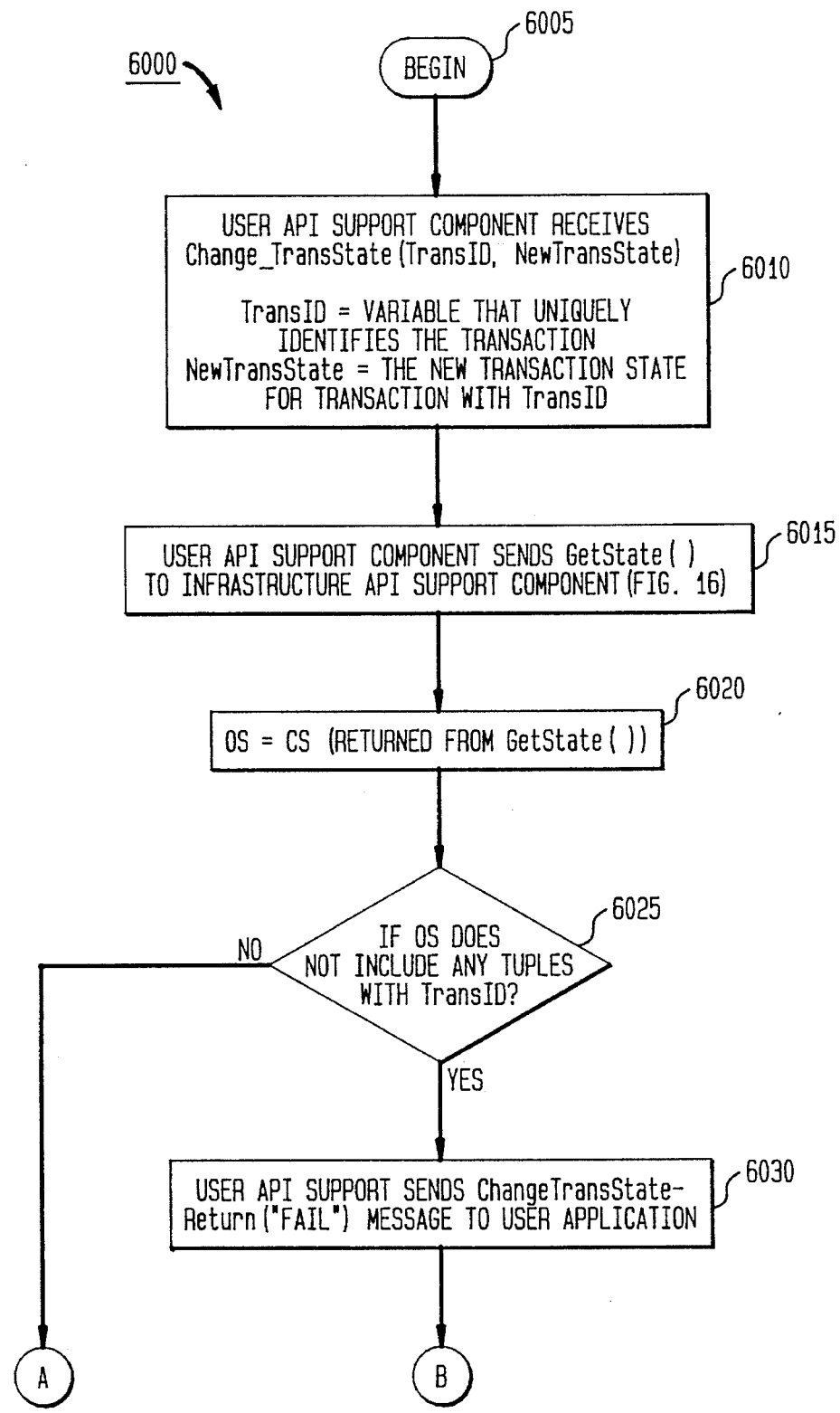
FIG. 21 is a flow diagram of steps performed by a User API Support Component to send messages to the Infrastructure API Support Component to change the transaction state of an object in an active database.
Figure 22:
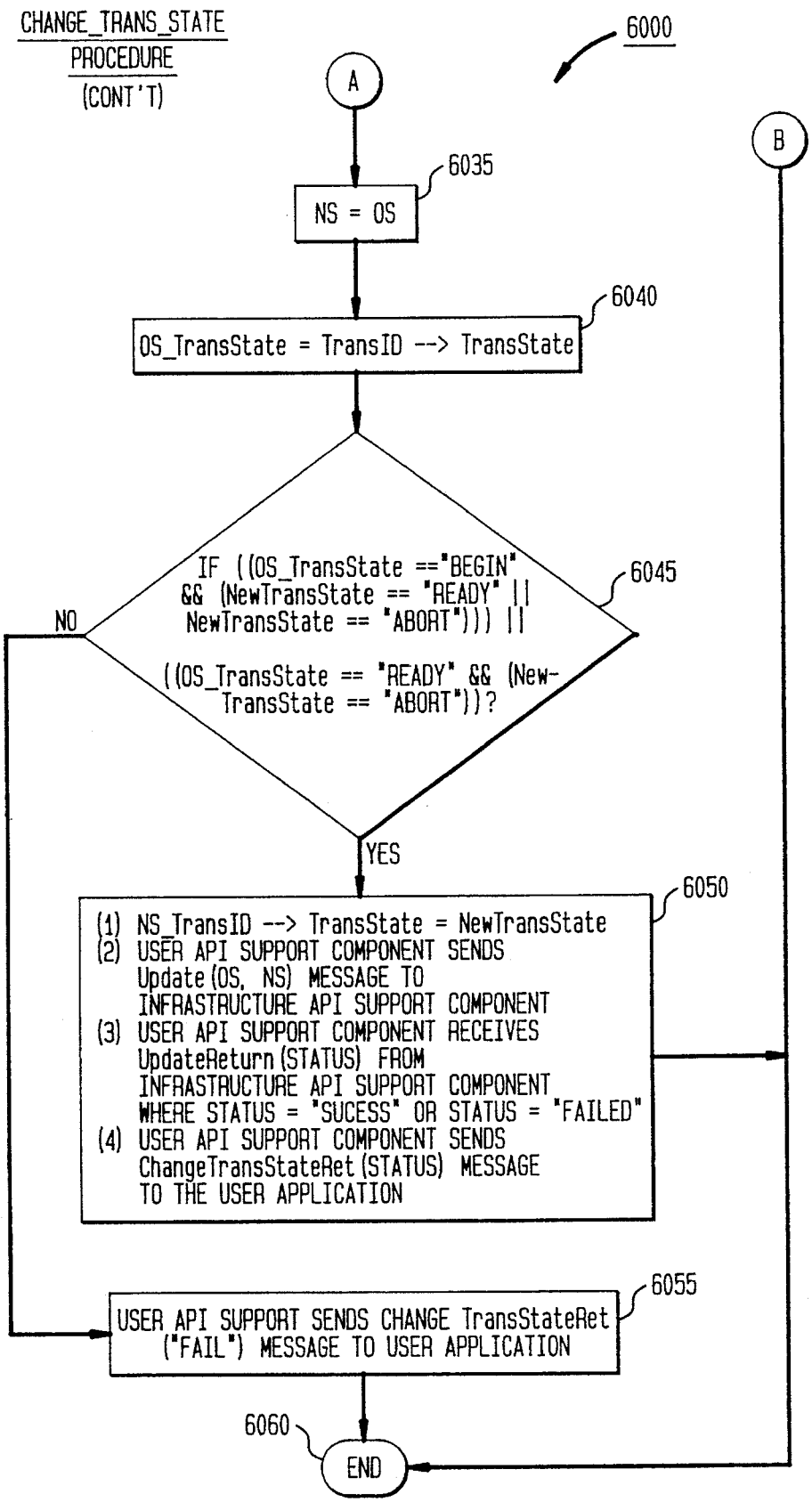
FIG. 22 is a flow diagram of steps performed by the User API Support Component to send messages to the Infrastructure API Support Component to change the transaction state of an object in an active database.
Figure 23:
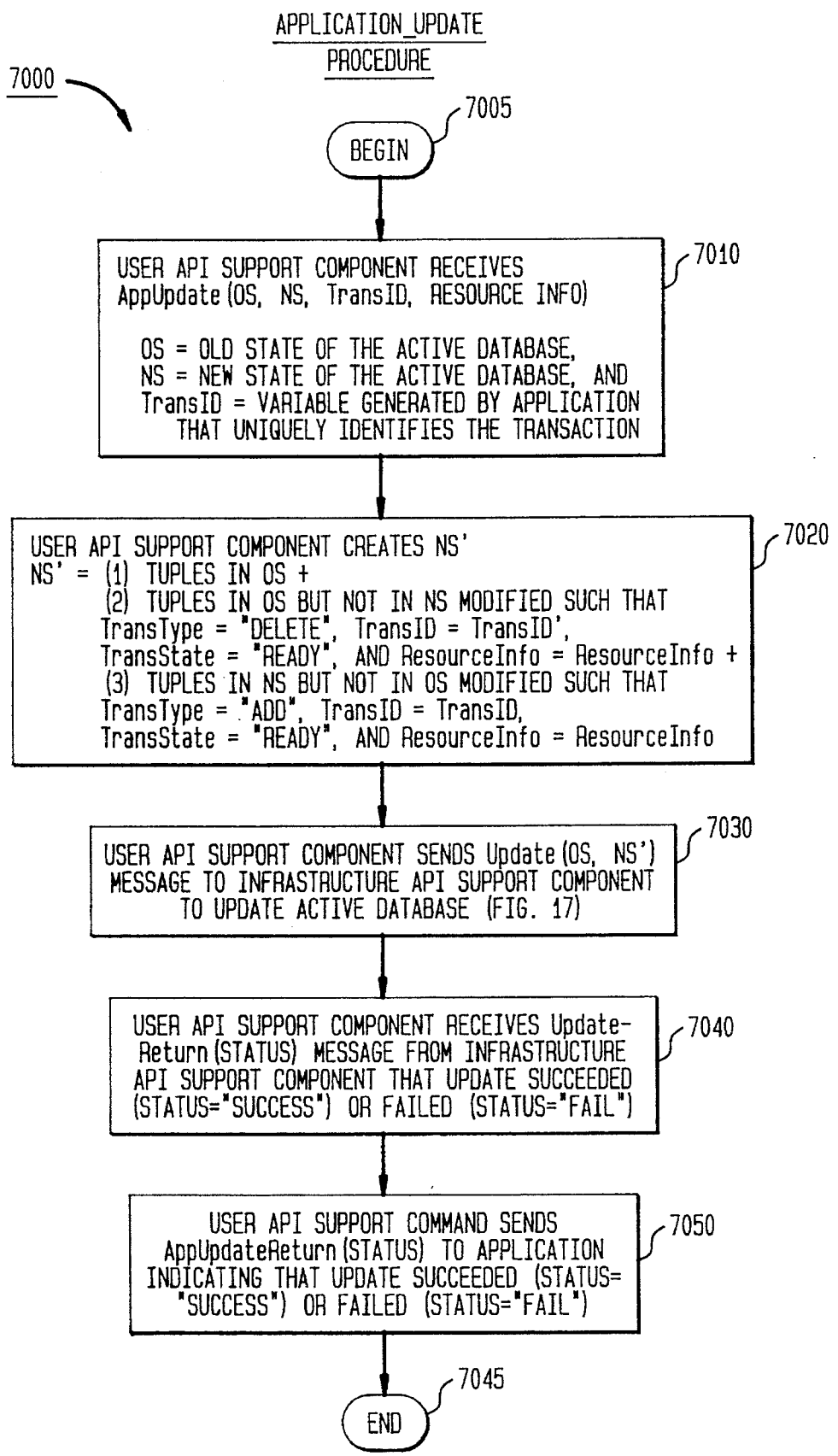
FIG. 23 is a flow diagram of steps performed by the User API Support Component to send messages to the Infrastructure API Support Component to update an active database.

FIGS. 21–23 contain flow diagrams of procedures performed or called by the User API Support Component 525 of FIGS. 5 and 6. The two procedures performed by the User API Support Component 525 are called Change_Trans_

State 6000 (FIGS. 21–22) and Application_Update 7000 (FIG. 23). In general, the User API Support Component 525 is in a "wait" state. In this wait state the User API Support Component 525 waits for input messages. It then responds to those messages by executing one of the procedures 6000 or 7000.

(i) Change_Trans_State

The Change_Trans_State 6000 begins (step 6005 in FIG. 21) when the User API Support Component 525 receives a ChangeTransState message from the user application 520 (step 6010). With the ChangeTransState message, the User API Support Component 525 receives a "transID" and a "newtransState." The "transID" is a unique identifier for a transaction and "newtransState" includes the new transaction state for the transID. In other words, the user application 520 specifies a unique transaction identifier, transID, and the desired state of the corresponding transaction.

The User API Support Component 525 then sends a GetState message to the Infrastructure API Support Component 510 (step 6015). Details on the GetState procedure 1000 performed by the Infrastructure API Support Component have already been explained (see FIG. 16). It was also explained that the Infrastructure API Support Component 510 returns a ReturnState message in response to a GetState message, and that the ReturnState message includes CS, i.e., the current state of the active database 505.

The User API Support Component 525 then sets the CS returned by the Infrastructure API Support Component 510 to OS in step 6020. Next, the User API Support Component 525 determines whether the OS does not include any tuples (from the system table of the active database 505) with the transID from the user application 520 (step 6025). If yes, then the User API Support Component 525 sends a ChangeTransStateReturn message to the user application 520 that reflects the fact that the user application's 520 ChangeTransState message failed (step 6030), and the User API Support Component 525 then completes the Change_Trans_State procedure 6000 (step 6060 of FIG. 22). Otherwise, the OS does include tuples with the transID (step 6025), and the User API Support Component 525 continues the procedure 6000 in step 6035 of FIG. 22.

In step 6035, the User API Support Component 525 sets NS equal to OS and then sets OS_transState equal to the transState identifier (from the transaction table in the active database 505) corresponding to ("-->") the transID received in step 6010 (step 6040).

If OS_transState is equal to "BEGIN" and either newTransState is equal to "READY" or ("||") newTransState is equal to "ABORT," or OS_transState is equal to "READY" and newTransState is equal to "ABORT" (step 6045), then the User API Support Component 525 performs the four substeps of step 6050. Otherwise, the requested change of state is not allowed and the User API Support Component 525 performs step 6055.

In the first substep of step 6050, the User API Support Component 525 sets the transState for NS_transID equal to the newTransState. In other words, the User API Support Component 525 updates the transaction table in NS so the that transState for the transID received in step 6010 is equal to the newtranState, which was also received in step 6010. The User API Support Component, in the second substep of step 6050, sends an Update message to the Infrastructure API Support Component 510. The Update message includes OS and NS.

In the third substep of step 6010, the User API Support Component 525 receives the UpdateReturn message from the Infrastructure API Support Component 510. The UpdateReturn message includes the status of the Update message, which may be "success" or "fail." Finally, in the fourth substep of step 6010, the User API Support Component 525 sends a ChangeTransStateRet message to the user application 520. This message includes the status returned from the Infrastructure API Support Component 510 in the previous substep.

In step 6055, the User API Support Component sends a ChangeTransStateRet message to the user application 520. In this case, the status for the ChangeTransState message returned to the user application 520 indicates that the process of updating a transaction state in the active database failed.

After performing step 6050 or step 6055, the User API Support Component 525 completes the Change_Trans_State procedure 6000 (step 6060).

(ii) Application_Update

The Application_Update procedure 7000 begins (step 7005 in FIG. 23) when the User API Support Component 525 receives an AppUpdate message from the user application 520 (step 7010). In this message, the user application 525 include the OS, NS, transID, and resourceInfo. The OS and NS in this case were explained in detail above with respect to FIGS. 6, 7, and 8.

In step 7020, the User API Support Component 525 creates NS'. NS' includes: (1) tuples from OS; (2) tuples from OS that are not in NS, in which the User API Support Component 525 changes the TransType to "DELETE," the TransID to the same as transID from the user application 520, the TransState to "READY," and the ResourceInfo to the same as resourceInfo from the user application 520 and; (3) tuples from NS that are not in OS, in which the User API Support Component 525 changes the TransType to "ADD," the TransID to the same as transID from the user application 520, the TransState to "READY," and the ResourceInfo to the same as resourceInfo from the user application 520. An example of how to determine tuples in NS' has already been explained above with reference to FIGS. 6, 7 and 8. The User API Support Component 525 then sends an Update message to the Infrastructure API Support Component 510 (step 7030). The Update message includes the OS and NS'.

In step 7040, the User API Support Component 525 receives the UpdateReturn message from the Infrastructure API Support Component 510. The UpdateReturn message includes the return status from the Update message, which may be "success" or "fail." Finally, the User API Support Component 525 sends an AppUpdateReturn message to the user application 520, which also includes the return status from the AppUpdate message. The status from the AppUpdate message may be "success" or "fail," depending upon whether the status from the UpdateReturn message from the Infrastructure API Support Component 510 was "success" or "fail."

c. The Resource Manager Component

Figure 24:
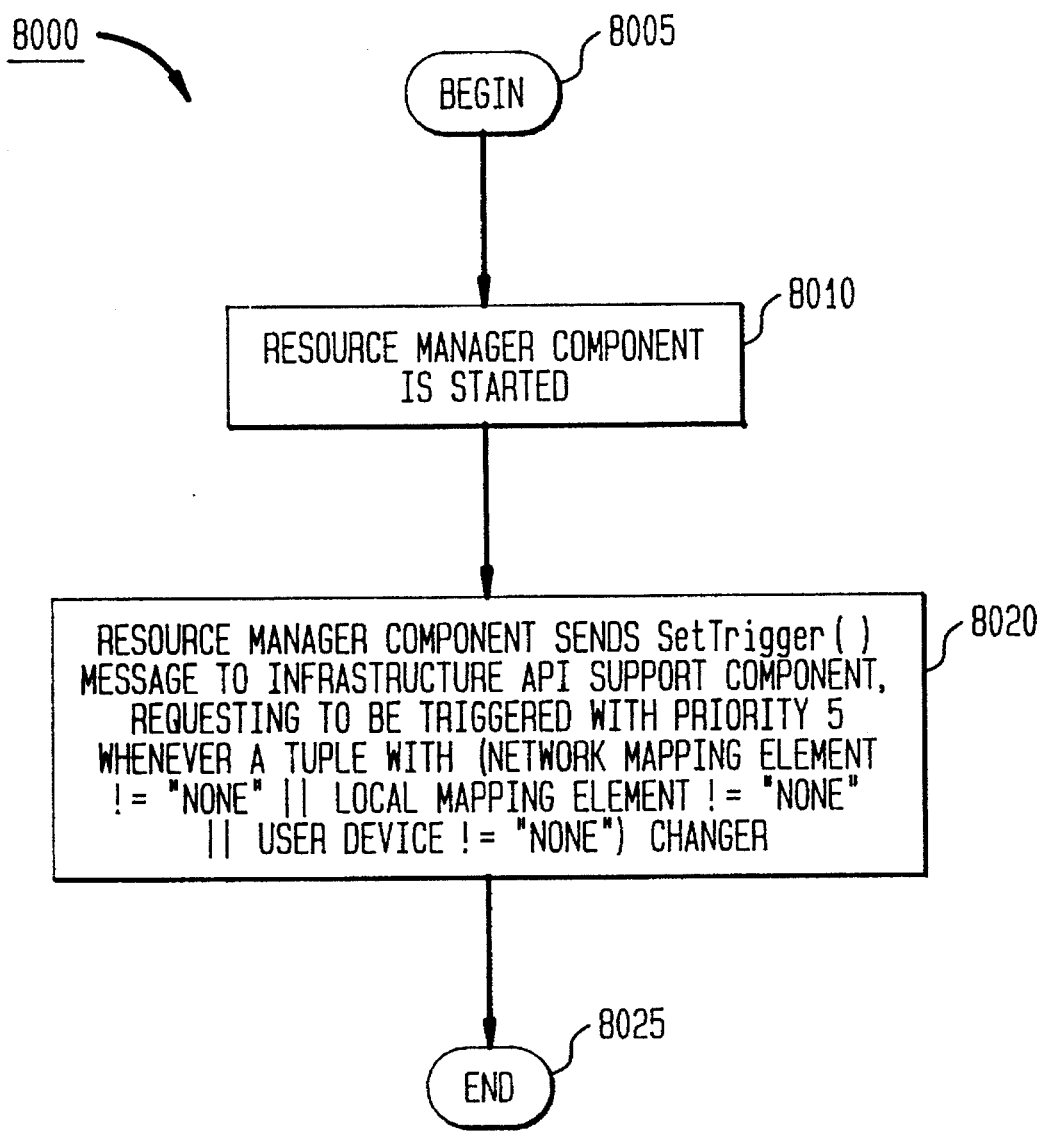
FIG. 24 is a flow diagram of steps performed by a Resource Manager Component to send messages to the Infrastructure API Support Component to set triggers in the active database.
Figure 25:
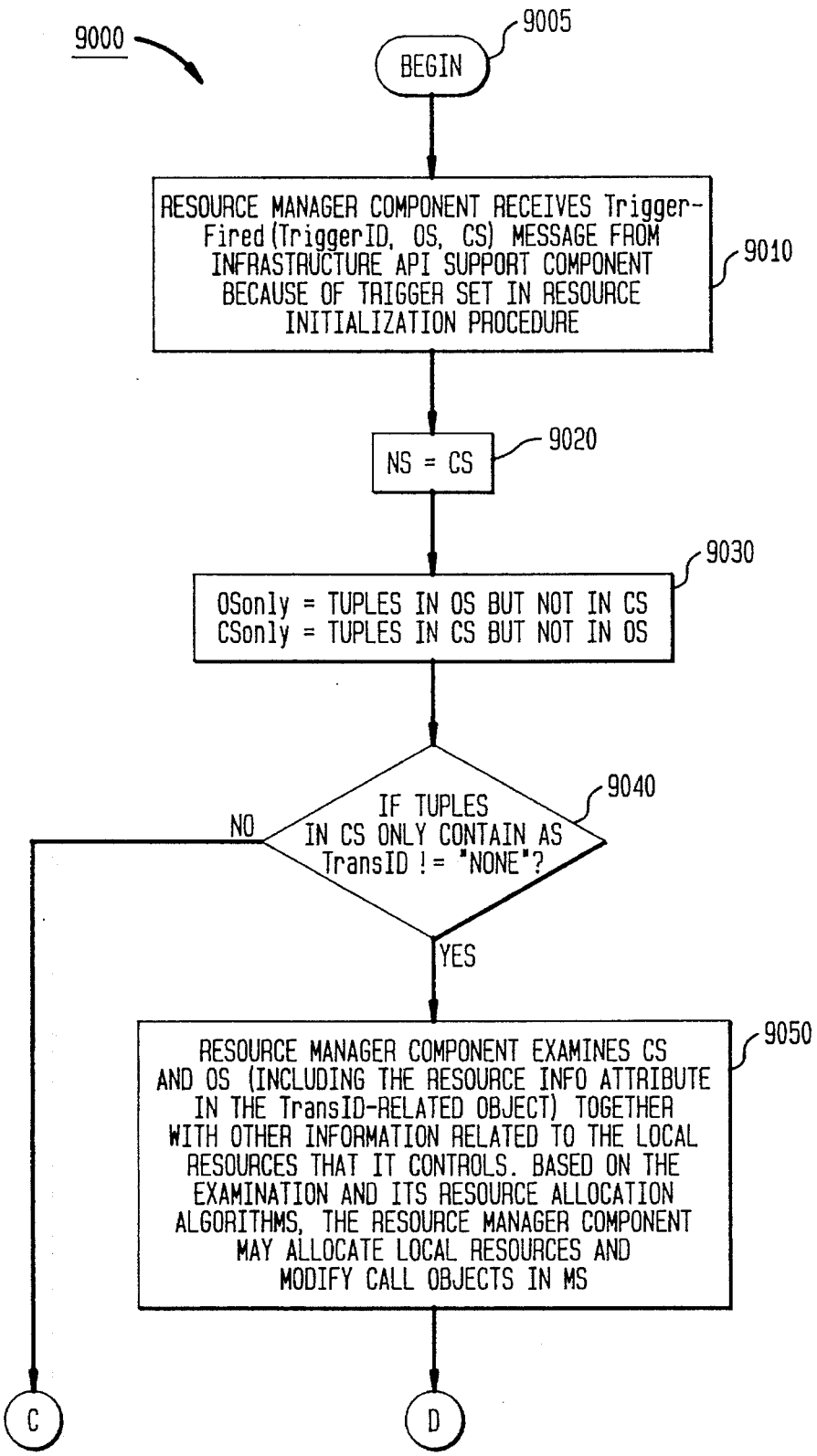
FIG. 25 is a flow diagram of steps performed by the Resource Manager Component to send messages to the Infrastructure API Support Component to update the resource information in the active database.
Figure 26:
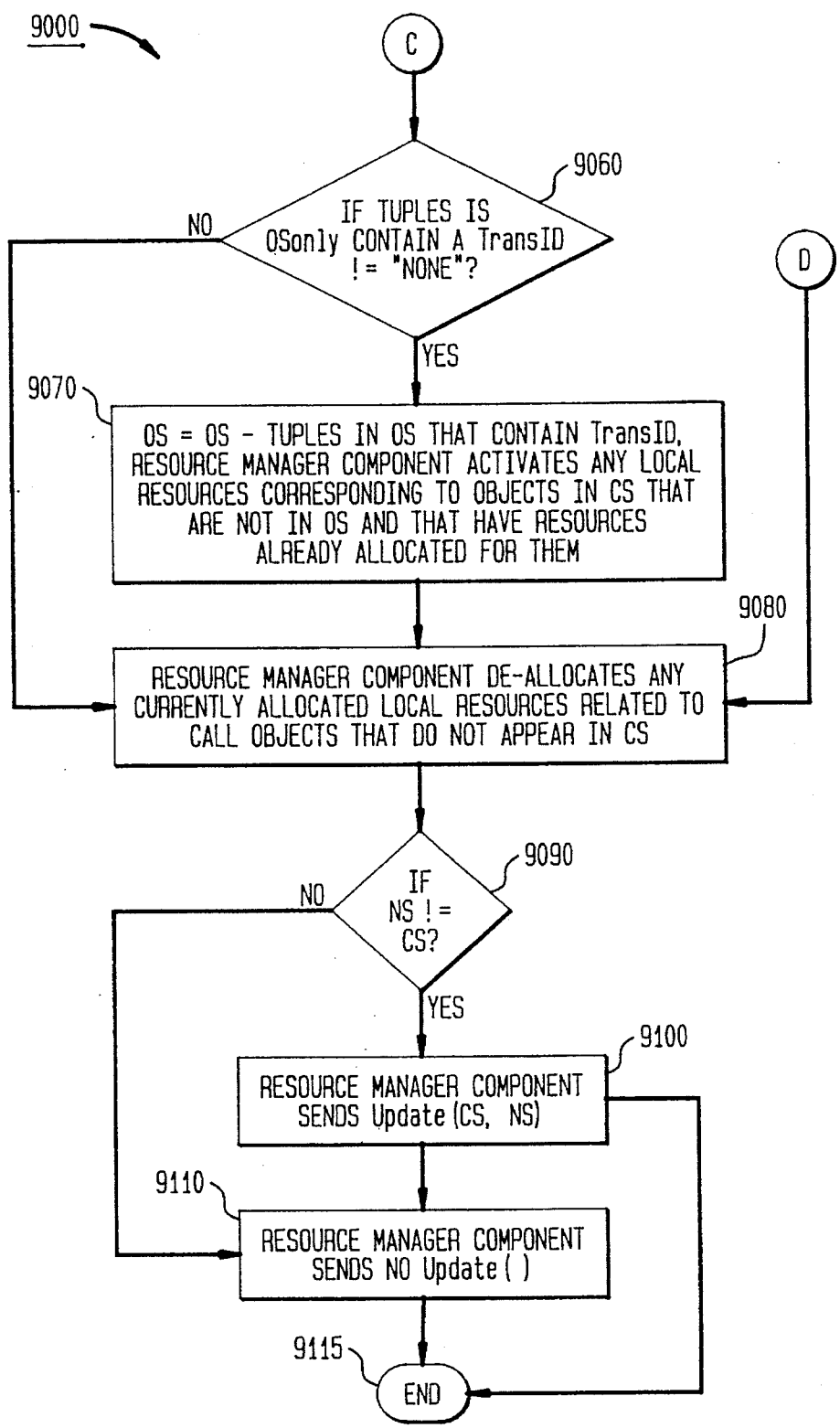
FIG. 26 is a flow diagram of steps performed by the Resource Manager Component to send messages to the Infrastructure API Support Component to update the resource information in the active database.

FIGS. 24–26 contain flow diagrams of procedures performed or called by the Resource Manager Component 530 of FIGS. 5 and 6. The two procedures performed by the Resource Manager Component 530 are called Resource Manager Initialization procedure 8000 (FIG. 24) and Update Resource procedure 9000 (FIGS. 25 and 26). In general, once the Resource Manager Component 530 is started and performs the steps of the Resource Manager Initialization procedure 8000, it enters a "wait" state. In this wait state the Resource Manager Component 530 waits for input messages. It then responds to those messages by executing the Update Resources procedure 9000 illustrated in FIGS. 25–26.

(i) Resource Manager Initialization Procedure

The Resource Manager Initialization procedure 8000 begins (step 8005 in FIG. 25) when the Resource Manager Component 530 is started (step 8010). This may occur, for example, when the personal computer or LAN in which the Resource Manager Component 530 resides is booted up.

Next, the Resource Manager Component 530 sends a Set_Trigger message to the Infrastructure API Support Component 510 (step 8020). The Set_Trigger message, as stated above, includes a "triggerID," "triggerConditions," and "priority." The triggerID is a unique identifier for the trigger. The triggerConditions include the conditions specified by the Resource Manager Component 530 that indicate when the Resource Manager Component 530 wants to be notified by the Infrastructure API Support Component 510 of an event, e.g., when a User Device identifier in the system table of the active database 505 is changed.

In the Set_Trigger message, the Resource Manager Component 530 requests to be triggered with priority 5 whenever a tuple in the system table changes that has a Network Mapping Element not equal to "none," a Local Mapping Element not equal to "none," or a User Device not equal to "none," i.e. add modify, or delete. Requiring that other applications, i.e., user application 520 and the Transaction Manager Component 520, register triggers with a priority lower than 5, the preferred implementation ensures that triggers requiring that some action by the Resource Manager Component 530 will be fired by the Infrastructure API Support Component 510 before triggers set by other applications and the Transaction Component Manager 520.

While the Resource Manager Initialization procedure 8000 requires the Resource Manager Component 530 to notify the Infrastructure API Support Component 510 of requested triggers and priorities after the Resource Manager Component 530 starts up, the Resource Manager Component 530 may also send other Set_Trigger messages to the Infrastructure API Support Component 510 at other times.

(ii) Update Resources Procedure

The main procedure included in the Resource Manager Component 530 is the Update Resources procedure 9000. The Update Resources procedure 9000 is illustrated in FIG. 25–26. The Update Resource procedure 9000 begins (step 9005 in FIG. 25) when the Resource Manager Component 530 receives a TriggerFired message from the Infrastructure API Support Component 510 (step 9010). The TriggerFired message includes a triggerID, OS, and CS. The Resource Manager Component 530 then sets NS equal to the CS received in step 9010 (step 9020).

Next, the Resource Manager Component 530 sets a variable OSonly to include the tuples in OS but not in CS, and a variable CSonly to include the tuples in CS but not in OS (step 9030). If the tuples in CSonly contain a transID not equal to "none" (step 9040), then the Resource Manager Component 530 examines the CS and OS (including the ResourceInfo attribute corresponding transID) together with other information related to the local resources that it controls and, based on this examination (as well as predefined resource allocation algorithms), the Resource Manager Component 530 may allocate local resources and modify call objects in NS (step 9050). This step handles the Resource Manager Component's 530 processing when the Transaction Manager Component 540 receives a "READY" signalling message from the telecommunications network. Further, the local resources may include hardware 280 (FIG. 2) for multimedia calls as well as other local hardware, e.g., camera, monitor, speaker, etc.

After performing step 9050, the Resource Manager Component 530 continues processing in step 9080 of FIG. 26, but if the tuples in CSonly contain only transID's equal "none" (step 9040), Resource Manager Component 530 continues processing in step 9060.

In step 9060, the Resource Manager Component 530 determines whether the tuples in OSonly contain a transID not equal to "none." If yes, the Resource Manager Component 530 sets OS equal to the received OS (step 9010) without the tuples in OS that contain transID and activates any local resources corresponding to objects in CS that are not in OS and that have resources already allocated for them (step 9070). Note that this step handles the Resource Manager Component's 530 processing when the Transaction Manager Component 540 receives a "COMMIT" or "FAIL" signalling message from the telecommunications network.

Then, or after step 9050, or if the tuples in OSonly do not contain a transID (step 9060), the Resource Manager Component 530 de-allocates any currently allocated local resources related to call objects that do not appear in CS (step 9080). If NS does not equal CS (step 9090), then the Resource Manager Component 530 sends an Update message with CS and NS to the Infrastructure API Support Component 510 (step 9100). The Update Resources procedure 9000 is then complete (step 9115 of FIG. 26). If, however, NS is equal to CS, then the Resource Manager Component 530 sends a NoUpdate message to the Infrastructure API Support Component 510 (step 9110) and the Update Resources procedure 9000 is then complete (step 9115 of FIG. 26).

d. The Transaction Manager Component

In the preferred implementation, the Transaction Manager Component 540 provides an interface between the telecommunications network protocol (i.e., incoming and outgoing signalling messages) and the Infrastructure API Support Component 510, which helps manage the call objects in the active database.

FIGS. 27–32 contain flow diagrams of procedures performed or called by the Transaction Manager Component 540 of FIGS. 5 and 6. The three procedures performed by the Transaction Manager Component 540 are called Transaction Manager Initialization 10000 (FIG. 27), Send Transaction To Telecommunications Network 11000 (FIGS. 28–39), Receive Inform Message From Telecommunications Network 12000 (FIG. 30), and Receive Transaction From Telecommunications Network 13000 (FIGS. 31–32).

In general, once the Transaction Manager Component 540 is started and performs the steps of the Transaction Manager Initialization procedure 10000, it enters a "wait" state. In this wait state the Transaction Manager Component 540 waits for input messages. It then responds to those messages by executing the steps of the Send Transaction To Telecommunications Network procedure 11000 (FIGS. 28–39), Receive Inform Message From Telecommunications Network procedure 12000 (FIG. 30), and Receive Transaction From Telecommunications Network procedure 13000 (FIGS. 31–32).

(i) Transaction Manager Initialization Procedure

The Transaction Manager Initialization procedure 10000 begins (step 10005 in FIG. 27) when the Transaction Manager Component 540 is started (step 10010). This may occur, for example, when the personal computer or LAN in which the Transaction Manager Component 540 resides is booted up.

Next, the Transaction Manager Component 540 sends a Set_Trigger message to the Infrastructure API Support Component 510 (step 10020). The Set_Trigger message, as stated above, includes a "triggerID," "triggerConditions," and "priority." The triggerID is a unique identifier for the trigger. The triggerConditions include the conditions specified by the Transaction Manager Component 540 that indicate when the Transaction Manager Component 540 wants to be notified by the Infrastructure API Support Component 510 of a tuple modification, creation, or deletion in the active database 505.

In the Set_Trigger message, the Transaction Manager Component 540 requests to be triggered with priority 0 whenever a tuple in the system table that has a TransState equal to "READY" or "ABORT" changes.

While the Transaction Manager Initialization procedure 10000 requires that the Transaction Manager Component 540 notify the Infrastructure API Support Component 510 of requested triggers and priorities after the transaction manager component 540 starts up, the Transaction Manager Component 540 may also send other Set_Trigger messages to the Infrastructure API Support Component 510 at other times.

(ii) Send Transaction to Telecommunications Network Procedure

The Send Transaction To Telecommunications Network procedure 11000 begins (step 11005 in FIG. 28) when the Transaction Manager Component 540 receives a Trigger-Fired message from the Infrastructure API Support Component (step 11010). The TriggerFired message includes a triggerID, OS, and CS. The type of information included in each of these variables sent with the TriggerFired message was explained above. It was also explained that, during the Transaction Manager Initialization procedure 10000, the Transaction Manager Component 540 sends SetTrigger messages to the Infrastructure API Support Component 510 including trigger information, i.e., triggerIDs, triggerConditions, and priorities.

The Transaction Manager Component 540 then creates TS. TS contains the tuples affected by the transaction that first caused the Infrastructure API Support Component 510 to send the TriggerFired message (step 11020). In the same step, the Transaction Manager Component 540 sets transID equal to the TransID of the transaction corresponding to TS.

The Transaction Manager Component 540 then determines whether the transState corresponding to the transID set in the previous step 11020 is equal to "READY" (step 11030). If yes, then the flow of the procedure 11000 continues with step 11040. Otherwise, flow continues in step 11050. In step 11040, the Transaction Manager Component 11040 examines tuples containing the transID and determines what signalling message must be sent to the telecommunication network (e.g., network 175 of FIG. 1) to modify the telecommunications network state so that it agrees with the information in NS. As explained above, the telecommunications network state differs from the state of the active database in that the telecommunications network state corresponds to the network's view of a call. The Transaction Manager Component 540 then generates the appropriate signalling message (of the type "READY") and sends it to the telecommunications network.

Step 11050 is executed when the transState associated with transID is not equal to "READY," which in this circumstance means the transState is equal to "ABORT." In this case the Transaction Manager Component 540 generates and sends a signalling message "ABORT" to the telecommunications network to cancel the transaction in the network.

After either step 11040 or 11050, the Transaction Manager Component 540 receives a signalling message from the telecommunications network indicating that the transaction in the network either succeeded, in which case the network sends a "COMMIT" message, or failed, in which case the network sends a "FAIL" message. If the Transaction Manager Component 540 receives a "FAIL" message (step 11070), then it sets NS equal to OS without the tuples with the transID that was set in step 11020 (step 11080). In other words, it deletes from NS all tuples associated with the transaction identified by transID. The Transaction Manager Component 540 then sends an Update message to the infrastructure API software component 510 with the OS, NS (step 11150 of FIG. 29) and completes the procedure 11000 (step 11155).

On the other hand, if the Transaction Manager Component 540 did not receive a "FAIL" message (step 11070) then a "COMMIT" message was received. In this case, the Transaction Manager Component 540 continues with the procedure 11000 at step 11090 of FIG. 29. In step 11090 the Transaction Manager Component 540 sets NS equal to OS.

Then, for each tuple in NS with a TransID equal to the transID (see step 11020 of FIG. 28), the Transaction Manager Component 540 determines whether the TransType related to the transID is "ADD" (step 11110) or "DELETE" (step 11130). If it is an "ADD" (step 11110), then the Transaction Manager Component 540 sets the transID and transType to "none" (step 11120). If it is a "DELETE" (step 11130), then the Transaction Manager Component 540 does two things. First, the Transaction Manager Component 540 finds the tuple in the system table of the active database that matches the tuple with the transID (i.e. everything in the tuple is the same except the transID). It then removes the found tuple and the tuple with the transID from NS (step 11140).

When all tuples in the NS with the TransID equal to transID have been processed in steps 11100 to 11140, the Transaction Manager Component 540 sends an Update message to the Infrastructure API Support Component 510 with the OS and NS (step 11150) and completes the procedure 11000 (step 11155).

(iii) Receive "INFORM" Message From Telecommunications Network Procedure

The Receive "INFORM" Message From Telecommunications Network procedure 12000 begins (step 12005 in FIG. 30) when the Transaction Manager Component 540 receives an incoming "INFORM" signalling message (step 12010). The "INFORM" signalling message indicates that the telecommunications network has added new network call objects or deleted network call objects corresponding to call objects represented in the active database 505.

The Transaction Manager Component 540 then creates an NS based on OS and the contents of the INFORM message (step 12020). (The OS in this case was stored by the Transaction Manager Component 540 from a previous transaction.) For example, the INFORM may cause tuples to be added to or deleted from the system table. The Transaction Manager Component 540 then sends an Update message to the Infrastructure API Support Component 510 with the NS and OS, and completes the procedure 12000 (step 12035).

As suggested above, if the Transaction Manager Component 540 is unable to update the active database 505 using the OS that it stored from a previous transaction, it will send a GetState message to the Infrastructure API Support Component 540 to get a new OS for purposes of creating the correct NS in step 12020.

The procedure 12000 differs from the other procedures discussed thus far in that it may cause the active database to get updated without a transaction.

(iv) Receive Transaction From Telecommunications Network Procedure

The Receive Transaction From Telecommunications Network procedure 13000 begins (step 13005 in FIG. 31) when the Transaction Manager Component 540 receives an incoming signalling message of type "BEGIN" indicating the start of a new transaction in the telecommunications network (step 13010). For example, the Transaction Manager Component 540 of the called party in a call receives a "BEGIN" indicating an incoming call.

The Transaction Manager Component 540 then generates a unique transID (step 13020). It then creates NS based on OS and the contents of the BEGIN message (step 13030). The NS includes OS plus tuples with the transID created in step 13020. These tuples indicate changes to the telecommunications network state that must be reflected in the active database 505. These tuples have the transState associated with the transID set to "BEGIN." (The OS in this case was stored by the Transaction Manager Component 540 from a previous transaction.) The Transaction Manager Component 540 then sends an Update message to the Infrastructure API Support Component 510 with the NS and OS (step 13040).

The Transaction Manager Component 540 then waits for one of two types of messages (step 13050). A TriggerFired message, indicating that a user application 520 accepted ("READY") or rejected ("FAIL") the transaction, causes the Send Transaction to Telecommunications Network procedure 11000 (step 13070) to be executed after which procedure 13000 completes (step 13095). If a "FAIL" message related to the transaction is received from the telecommunications network, the Transaction Manager Component 540 sets NS equal to OS minus the tuples which contain a TransID identifier of transID (step 13080 of FIG. 32). In other words, it removes from NS all tuples associated with the transaction. It then sends an Update message to the Infrastructure API Support Component 510 with the NS and OS (step 13090), and completes the procedure 13000 (step 13095).

Persons skilled in the art will recognize that the present invention described above overcomes problems and disadvantages of the prior art. They will also recognize that modifications and variations may be made to this invention without departing from the spirit and scope of the general inventive concept.

For example, in the preferred implementation uses the CCR message flow as a telecommunications network signalling protocol Also, in the preferred implementation, the telecommunications network represents calls as related objects similar to the network call objects in the active database. However, it may be possible to use other signalling protocols in the telecommunications network. In this case, the functions of the transaction manager component would include translating between the telecommunications network signalling protocol and the CCR message flow as well as the representation of calls in the active database.

In addition, a single transaction manager component could be connected to more than one telecommunications network where each telecommunications network uses a different signalling protocol. The transaction manager component would determine which telecommunications network to send the information describing a call.

Further, multiple transaction manager components, each interfaced to a different telecommunications network, could have triggers registered with the infrastructure API support component. In this case all parties in a transaction would have to be accessible to the same telecommunications network. In other words, if "transID" is a TransactionID, all the Party Objects related to transID must correspond to parties on the same Telecommunications Network.

Additionally, throughout the above description of the preferred implementation, other implementations and changes to the preferred implementation were discussed. Thus, this invention in its broader aspects is therefore not limited to the specific details or representative methods shown and described.

I claim:

1. A system for enabling applications to interface with a network, wherein the network manages multiparty multimedia calls, the system comprising:

means for initiating and receiving multiparty multimedia calls;

means for storing building blocks representing the multiparty multimedia calls associated with the applications, the building blocks including object data identifying parts of the multiparty multimedia calls and relationship data representative of relationships between the parts of the multiparty multimedia calls; and means for monitoring a current state of the object data and the relationship data, and for determining when the current state changes.

2. The system of claim 1 further comprising:

resource altering means for altering the resources required for the multimedia multiparty calls when the current state changes.

3. The system of claim 2 wherein new resources are required for the multimedia multiparty calls when the resource altering means alters the resources required for the multimedia multiparty calls when the current state changes.

4. The system of claim 2 wherein at least one of the resources is no longer required for the multimedia multiparty calls when the resource altering means alters the resources required for the multimedia multiparty calls when the current state changes.

5. A system for enabling applications to interface with a network that manages multiparty multimedia calls, the system comprising:

means for initiating and receiving requests for multiparty multimedia calls;

means for storing building blocks representing the multiparty multimedia calls associated with applications, the building blocks including object data identifying parts of the multiparty multimedia calls and relationship data representative of relationships between the parts of the multiparty multimedia calls; and means for monitoring a current state of the object data and the relationship data;

means for receiving requests for changing the current state;

means for updating the building blocks in response to the requests.

6. A method for initiating network transactions to create, modify, or delete network calls by sending signalling messages to a telecommunications network in response to requests from user applications operating in a computer, wherein a database stores call objects corresponding to the network calls and involving the user applications, the method comprising the steps, implemented by the computer including the database, of:

receiving a message from one of the user applications including a new state of call objects;

obtaining a current state of the call objects stored in the database;

comparing the current state with the new state and creating data representative of a super-state of the call objects from the current state and object-differences, wherein the object-differences are differences between the call objects of the current state and the call objects of the new state;

updating the database with the data representative of the super-state; and generating a signalling message to initiate a network transaction to transition to the new state.

7. The method of claim 6 wherein the generating step includes the substeps of:

receiving a trigger notification that the database was updated with the data representative of the super-state; and identifying the object-differences in the super-state, wherein the object-differences correspond to the network transaction.

8. The method of claim 6 further comprising the step of:

sending the signalling message to the telecommunications network.

9. The method of claim 6 further comprising the steps of:

receiving a response signal from the telecommunications network;

determining whether the response signal indicates that the telecommunications network successfully completed the network transaction;

identifying the object-differences in the super-state;

modifying the super-state to reflect the successful completion of the network transaction; and updating the database to include the modified super-state.

10. The method of claim 6, wherein the network calls require multimedia resources.

11. The method of claim 6, wherein the network calls are multimedia multiparty calls.

12. A method for interfacing with a telecommunications network, wherein signalling messages are received from the telecommunications network, the signalling messages corresponding to network transactions including creating, modifying, or deleting the network calls involving user applications, and wherein a database stores call objects corresponding to the network calls, the method comprising the steps, implemented by a computer including the database, of:

receiving a signalling message from the telecommunications network indicating a network transaction;

generating a new state of the call objects including at least data corresponding to the network transaction;

obtaining a current state of the call objects stored in the database;

comparing the current state with the new state and creating data representative of a super-state of the call objects from the current state and object-differences, wherein the object-differences are differences between the call objects of the current state and the call objects of the new state;

updating the database with the data representative of the super-state;

generating a trigger notification that the database was updated with the super-state; and sending the trigger notification to the user applications.

13. The method of claim 12, wherein the step of generating a trigger notification includes the substep of:

identifying the object-differences in the data representative of the super-state, wherein the object-differences correspond to the network transaction.

14. The method of claim 12 further comprising the steps of:

receiving a response message from one of the user applications;

determining whether the response message indicates that the one of the user applications agrees to complete the network transaction;

identifying the object-differences in the super-state, wherein the object-differences correspond to the network transaction;

modifying the super-state to reflect the successful completion of the network transaction; and updating the database to include the modified super-state.

15. The method of claim 12, wherein the sending step includes the substep of:

selecting one of the user applications based on data included in the trigger notification.

16. A method for invoking changes to calls in a communications network to reflect changes in a database storing objects corresponding to the calls, the database also storing trigger information indicating when to notify at least one application of changes in the database, the method comprising the steps, implemented by a computer including the database, of:

receiving from the at least one application a set-trigger message including new trigger information for an object in the database;

storing the new trigger information in the database;

receiving an update message requesting a change to one of the objects in the database;

sending, in response to the change to the object in the database, a trigger-fired message to the at least one application, the trigger-fired message indicating the requested change to the one object; and generating a signalling message to the communications network to change the calls to correspond to the requested change to the objects in the database.

\* \* \* \* \*